US008738428B2

(12) United States Patent
Magowan et al.

(10) Patent No.: US 8,738,428 B2
(45) Date of Patent: May 27, 2014

(54) MANAGING RETAIL PROMOTION EVENTS

(75) Inventors: Charles Magowan, San Francisco, CA (US); James Caldwell, Fairfax, CA (US); Edward Martin, Ripon, CA (US); R. Brooke Hanson, Tiburon, CA (US); Russell Hafferkamp, Piedmont, CA (US)

(73) Assignee: International Business Machines Corporation, Armonk, NY (US)

( * ) Notice: Subject to any disclaimer, the term of this patent is extended or adjusted under 35 U.S.C. 154(b) by 1947 days.

(21) Appl. No.: 10/997,371

(22) Filed: Nov. 23, 2004

(65) Prior Publication Data
US 2005/0144075 A1    Jun. 30, 2005

Related U.S. Application Data
(60) Provisional application No. 60/525,500, filed on Nov. 25, 2003.

(51) Int. Cl.
G06Q 30/00    (2012.01)

(52) U.S. Cl.
USPC ........................................................ 705/14.1

(58) Field of Classification Search
USPC ............................... 705/14, 1, 80, 10; 399/12
See application file for complete search history.

(56) References Cited

U.S. PATENT DOCUMENTS

| 5,832,458 | A  | * | 11/1998 | Jones ............................... 705/14 |
| 6,167,378 | A  | * | 12/2000 | Webber, Jr. ....................... 705/8 |
| 6,798,997 | B1 | * |  9/2004 | Hayward et al. ................ 399/12 |
| 2001/0018665 | A1 | * |  8/2001 | Sullivan et al. ................. 705/14 |
| 2002/0022963 | A1 | * |  2/2002 | Miller et al. ...................... 705/1 |
| 2002/0120588 | A1 | * |  8/2002 | Preist et al. ..................... 705/80 |
| 2002/0173972 | A1 | * | 11/2002 | Daniel et al. ...................... 705/1 |
| 2003/0028424 | A1 | * |  2/2003 | Kampff et al. .................. 705/14 |

OTHER PUBLICATIONS

Crystal keen: Crystal Reports Tools: Improve Performance while saving time and money; http://crystalkeen.com/crystalreports/pdfexport.htm.*
Harald J. Van Heerde, *Models for Sales Promotion Effects Based on Store-Level Scanner Data*, Labyrint Publication, 1999, 212 pages.
Kusum Ailawadi, *Trade Promotion: Essential to Selling Through Resellers*, Sloan School of Management, Fall 1999, 14 pages.

(Continued)

*Primary Examiner* — Afaf Ahmed Osman Bilal Ahmed
(74) *Attorney, Agent, or Firm* — Rahan Uddin; Edell, Shapiro & Finnan, LLC

(57) ABSTRACT

Disclosed are techniques for the creation, communication, negotiation, and storage of promotion events between trading partners. A promotion event is managed between a retailer and a vendor each having an associated computer in communication with a data network. The promotion event is defined to include terms, including an event description and a designated items description. The terms are situated in fields of a promotion event record. The designated items description is matched to a list of items stored in an item table. This list of items is authorized for sale by the retailer. A validation operation includes determining whether the fields in the promotion event record conform to requirements of a deal sheet associated with the retailer. The promotion event record is stored as a deal in a deal transaction storage medium. The retailer computer is provided with read access to the stored deal. The retailer can then negotiate the stored deal with the vendor. The vendor can revise the terms of the stored deal as desired. Further negotiation can occur until the deal is accepted.

44 Claims, 22 Drawing Sheets

(56) References Cited

OTHER PUBLICATIONS

Orler et al., *The Daunting Dilemma of Trade Promotion: Why Most Companies Continue to Lose the Battle—and How Some are Winning the War*, Accenture, 2001, 27 pages.

GMA Publications, http://www.gmabrands.com/publications/index.cfm, printed Feb. 22, 2005, 2 pages.

*Trade Relations in the Produce Market: Retailing, Distribution, and Antitrust Considerations*, Keller and Heckman, http://www.khlaw.com/index.cfm?fuseaction=publications, printed Feb. 23, 2005, 15 pages.

ViaLink's newsLink online, vol. 3, No. 2, http://www1.vialink.com/newslink/February02/, printed Mar. 3, 2005, 7 pages.

*Investors Press Releases*, ViaLink, http://www2.vialink.com/investors/press-releases/08_03_00.html, printed Mar. 3, 2005, 3 pages.

*ViaLink and Transora Establish GDSN Data Pool Relationship; Complete Partner Certification Agreement for Synchronizing Supply Chain Data with Transora*, Retail Technology Milestones News Article, http://www.rtmilestones.com/article.asp?ArticleId=3050, printed Mar. 3, 2005, 2 pages.

Pan, *Trade Matters: Evaluating Your Promotions*, Swander Pace Company, vol. 13, Issue 2.2, 2 pages.

\* cited by examiner

| | Item Number | UPC Case | UPC Consumer | Item Description | Pack | Pack Size | Match Description | Item Group | Alt Perf Code 1 | Alt Perf Code 2 |
|---|---|---|---|---|---|---|---|---|---|---|
| Edit Duplicate ☑ | 11150038 | 8798903023 | 893270915 | CHOCOLATE CHIP COOKIES | 12 | 12/8 CT | Verified | | | |
| Edit Duplicate ☑ | NEW | 0432890124 | 802478023 | Cinnamon Roll | 12 | 12/14.08 OZ | No Match | | | |
| Edit Duplicate ☑ | NEW | 0983855466 | 249392045 | Vanilla Buns | 12 | 12/14.1 OZ | No Match | | | |
| Edit Duplicate ☐ | 11150067 | 1234903405 | 234958722 | Berry Roll | 12 | 12/21.1 OZ | Verified | | | |
| Edit Duplicate ☑ | 11150040 | 2345098234 | 2345476732 | Almond Flake | 12 | 12/22 OZ | Verified | | | |
| Edit Duplicate ☐ | | 2457878337 | 3734563788 | Strawberry Flake | 10 | 10/24.4 OZ | No Match | | | |
| Edit Duplicate ☐ | | 3568946789 | 2465884563 | BRN. SUGAR ROLL | 10 | 10/23.4 OZ | No Match | | | |
| Edit Duplicate ☐ | | 3456890043 | 3890056780 | CHOCOLATE CHIP ROLL | 12 | 12/22 OZ | No Match | | | |
| Edit Duplicate ☐ | 11150223 | 3092049582 | 4679490067 | CHOCOLATE BUNS | 12 | 12/14.7 OZ | Verified | | | |

Deal Center

Offer #: _____  Division: _____  Vendor Name: _____

Warehouse #: _____  Vendor #: _____  Log #: _____

[View Cover Sheet] [View Summary]  [Find]

Master Deals  Divisions  No Deal Cover Sheets  Processed  Specialist [Joe Smith]  [Log Off] [Re-Assign]

| Select | Vendor Log # | Division | Vendor | Offer # | Description | Perf. Name | Perf. Start Date |
|---|---|---|---|---|---|---|---|
| ☐ | Process | 10 - Toledo | CPG CO | R010505E | Jan A 2005 All Family #1 deal | A | January 1/5/2005 |
| ☐ | Process | 17 - Phoenix | CPG CO | R010505E | Jan A 2005 All Family #1 deal | A | January 1/5/2005 |
| ☐ | Process | 19 - Portland | CPG CO | R010505E | Jan A 2005 All Family #1 deal | A | January 1/5/2005 |
| ☐ | Process | 20 - Texas | CPG CO | R010505E | Jan A 2005 All Family #1 deal | A | January 1/5/2005 |
| ☐ | Process | 25 - Spokane | CPG CO | R010505E | Jan A 2005 All Family #1 deal | A | January 1/5/2005 |
| ☐ | Process | 27 - Seattle | CPG CO | R010505E | Jan A 2005 All Family #1 deal | A | January 1/5/2005 |
| ☐ | Process | 29 - Sacramento | CPG CO | R010505E | Jan A 2005 All Family #1 deal | A | January 1/5/2005 |
| ☐ | Process | 35 - Eastern | CPG CO | R010505E | Jan A 2005 All Family #1 deal | A | January 1/5/2005 |

2100

MANAGING RETAIL PROMOTION EVENTS

REFERENCE TO EARLIER-FILED APPLICATION

This application claims benefit of priority from U.S. Provisional Patent Application No. 60/525,500, filed Nov. 25, 2003, and entitled "System and Methods for Managing Retail Promotion Events," which is hereby incorporated by reference.

FIELD

This invention generally relates to techniques for managing communications between retailers and their vendor trading partners. More particularly, this invention relates to secure electronic systems and methods for creating, disseminating, negotiating, managing, and archiving messages concerning promotion events, terms of promotion events, and attributes of items supplied between the trading partners.

BACKGROUND

Manufacturers, wholesalers, suppliers, distributors, and other types of vendors in a supply chain communicate the attributes and terms of any items offered for purchase through the exchange of business forms, each of which is unique to the specific retailer. Of these several processes of communication, there is an especial and complex effort to promote products to retailers and encourage sell-through to the consumer by offering the retailers a complex assortment of discounts, allowances, payments, terms, and performance incentives. Examples of these promotion schemes include reducing the price per case of a product, funding an advertising event, and conditional payment based on sales. However, many vendors and retailers (e.g., grocers) of consumer packaged goods (CPG) consider these promotions their primary management and spending problem. The more money vendors invest in promotions, the greater the number of individual promotions, and the greater the burden of keeping the paperwork in order. Each deal imposes a variety of transaction costs on the trading partners. These costs include completing tens of millions of deal sheets, planning and negotiating each deal's terms, auditing performance, and reconciling payments. For retailers, these costs often limit consumer pass through to half the value offered by the promotion.

The direct costs of promotions are a substantial and material portion of the manufacturer's costs, often amounting to 15% of sales. In addition, manufacturers incur material costs meeting an individual retailer's business process requirements for the creation, dissemination, negotiation and documentation of promotions. Manufacturers are also obliged to offer promotions to their retailers in compliance with federal and state anti-trust regulations, such as the Robinson-Patman Act.

Retailers compete for the promotions and payment terms offered by their vendors. For retailers, promotions are an important and profitable merchandising tool. For example, grocers often earn up to 40% of their net income through promotional programs. Generally, the value of the promotions retailers receive can be equal to 10% or more of their sales. However, retailers also incur material costs associated with managing their business processes for promotions. These costs are commonly as high as 5% of their sales. Similar to their vendors, retailer participation in promotions is also subject to antitrust regulations, including the Robinson-Patman Act.

Retailers and their supply chain trading partners are also required, as applicable, to satisfy accounting and reporting requirements, including Financial Accounting Standards Board (FASB) directives, SEC and other stock exchange regulations, and the Sarbanes-Oxley Act. These rules and regulations require companies to document the terms of their promotions, adjust sales and costs of goods sold according to the terms of each promotion, administer internal financial controls and certify the accuracy of their financial reports. The value of the promotion is a material modification of the listed prices for the promoted products; therefore, compliance with financial regulations is dependent upon scrupulous documentation of any promotions.

In current practice, documented promotions are considered by retailers to be binding commitments of the vendors to comply with the terms of the promotion; however, retailers usually do not commit themselves as counterparties to a contract through the process of negotiating a promotion. Retailers may or may not undertake to fulfill any performance required of them by the terms of the promotion in order to earn any allowance, payment or incentive negotiated with a vendor. Consequently, retailers and their trading partners must subsequently determine and agree whether or not a retailer has met the burdens of performance required to earn the benefits offered per terms of a promotion. The quality of this process of auditing and reconciliation is critically dependent upon the quality and consistency of the trading partners' sources of information documenting their promotions. Given the limitations of conventional systems and methods for managing the business processes associated with promotions, the auditing and reconciliation process is time consuming, often requiring years to achieve a final reconciliation. It is frequently a source of controversy and mistrust between trading partners.

There are several systematic and methodical approaches to the current art of managing promotion business processes. In one approach, the vendor uses an EDI (Electronic Data Interchange) protocol and means of EDI messaging, such as a Virtual Private Network to communicate the terms of a promotion to a retailer. The trading partners may thereafter negotiate final terms requiring the vendor to submit an amended EDI document. The limitation of this system is that the EDI protocol supports a small fraction of the diverse types of promotions commonly offered. Additionally, EDI systems are costly and not widely used. They have been adopted by less than 10% of the retail supply chain members.

In another conventional approach, the retailer provides its vendors with a multi-page carbon paper form. Vendors must complete this form to document their offers of any promotions. In the event of any negotiated changes to the terms of the promotion, the vendor submits an additional revised paper form. When paper forms are used, the workload and organizational requirements of manual submission and processing of millions of paper forms for various promotions are unmanageable, inefficient, and a source of friction between trading partners. Problems include heavy administrative burdens (filing, storing, retrieving), keypunch and other input costs, data entry errors, duplicated effort (i.e. missing items on deals, wrong dates), limited access to information, and missed promotional monies. In addition, with all of the paper shuffling, offers or requests for promotions can be entirely missed.

In another conventional approach, the retailer provides its vendor with an Excel template form. The process of managing Excel template forms is otherwise similar to the process of managing carbon paper forms.

In yet another conventional approach, a retailer adopts proprietary software presenting the vendors an interface requiring the vendor to input the terms of the promotion into the data fields of the interface. This software may be offered to the vendors for installation on their own computers, or, the retailers may present the interface through kiosks that are accessible to their vendors. As applicable, vendors may be required to retransmit promotion terms.

In addition, conventional techniques of retail supply chain communications may be predicated upon the abandonment of the unique and company specific data standards and forms that characterize the accepted processes in favor of a common industry standard, or, in favor of some other proprietary standard based upon a shared data type definition and transaction set that may be applied piecemeal to such companies. For instance, one conventional technique attempts to standardize a portion of the attributes that characterize an item, such as its color or weight. Conventional approaches do not provide any such standard for the communication of prices or promotions.

Each of the above-mentioned approaches to promotion management is considered by persons knowledgeable in the field to be limited and suboptimal in consideration of recent growth in the number of promotions, increasing complexity of the terms of promotions, and new regulatory requirements. In addition, none of these approaches directly supports the interactive negotiations that are a necessary process within the overall process for managing the promotion business process. The above-mentioned approaches may also suffer from suboptimal security, authentication of trading partners, and legal enforceability of any output documents. And in some cases, the techniques employed do not contribute to a shared record or other mutual understanding of the promotion terms negotiated between the trading partners.

SUMMARY

Disclosed are methods and apparatus, including computer program products, implementing and using techniques for the creation, communication, negotiation, and storage of promotion events between trading partners.

According to one aspect of the present invention, computer-implemented methods and apparatus provide management of a promotion event over a data network between a retailer and a vendor each having an associated computer in communication with the data network. The promotion event provides a scheme for rewarding the retailer for offering designated items supplied through the vendor for sale to consumers on behalf of the vendor. The promotion event is defined to include terms, including an event description and a designated items description. The terms are situated in fields of a promotion event record. The designated items description is matched to a list of items stored in an item table. This list of items is authorized for sale by the retailer. A validation operation includes determining whether the fields in the promotion event record conform to requirements of a deal sheet associated with the retailer. When the fields do not conform, an edit message is sent to the vendor computer, requesting editing of the terms in the promotion event record. When the fields conform to the deal sheet requirements, the promotion event record is stored as a deal in a deal transaction storage medium, and is designated as having a submitted status. When the deal is in submitted status, the retailer computer is provided with read access to the stored deal over the data network.

According to one aspect of the present invention, after the retailer computer accesses the stored deal, either a deal accept message or a deal negotiation message is received from the retailer computer over the data network. Responsive to receiving the deal negotiation message, the stored deal is designated as having a negotiate status. Responsive to receiving the deal negotiation message, edit access to the stored deal is provided for the vendor computer over the data network. Responsive to receiving the deal accept message, the deal is designated as having a complete status.

According to one aspect of the present invention, when the deal has negotiate status, revisions to the terms of the stored deal can be received from the vendor computer over the data network. The stored deal is updated to include these term revisions. Read access is again provided to the stored deal for the retailer computer to access the term revisions. Further deal negotiation messages can be received from the retailer computer over the data network, and the deal further edited, until the deal is accepted.

According to one aspect of the present invention, authorized users of the methods and apparatus are assigned roles to determine their access to business process rules engines, stored data, and workflow privileges. Examples of such users include vendors, retailers, buyers, specialists, and other designated parties. In one aspect, the user can be presented with several methods for creating, reviewing, and editing retail promotion events according to the formats, specific business process requirements, and authorized item catalogs of trading partners. One aspect of the present invention includes a user interface and embedded logic rules to facilitate these promotion event management functions. Each promotion event is assigned a negotiation status to facilitate orderly workflow and version control. In one aspect, the invention supports reporting outputs conforming to the paper layout of the vendor forms used to document retail promotion events.

BRIEF DESCRIPTION OF THE FIGURES

FIGS. 9-21 show screen displays of user interfaces accessible for managing promotion events, in accordance with embodiments of the present invention.

Like reference symbols in the various drawings indicate like elements.

Figure 1:
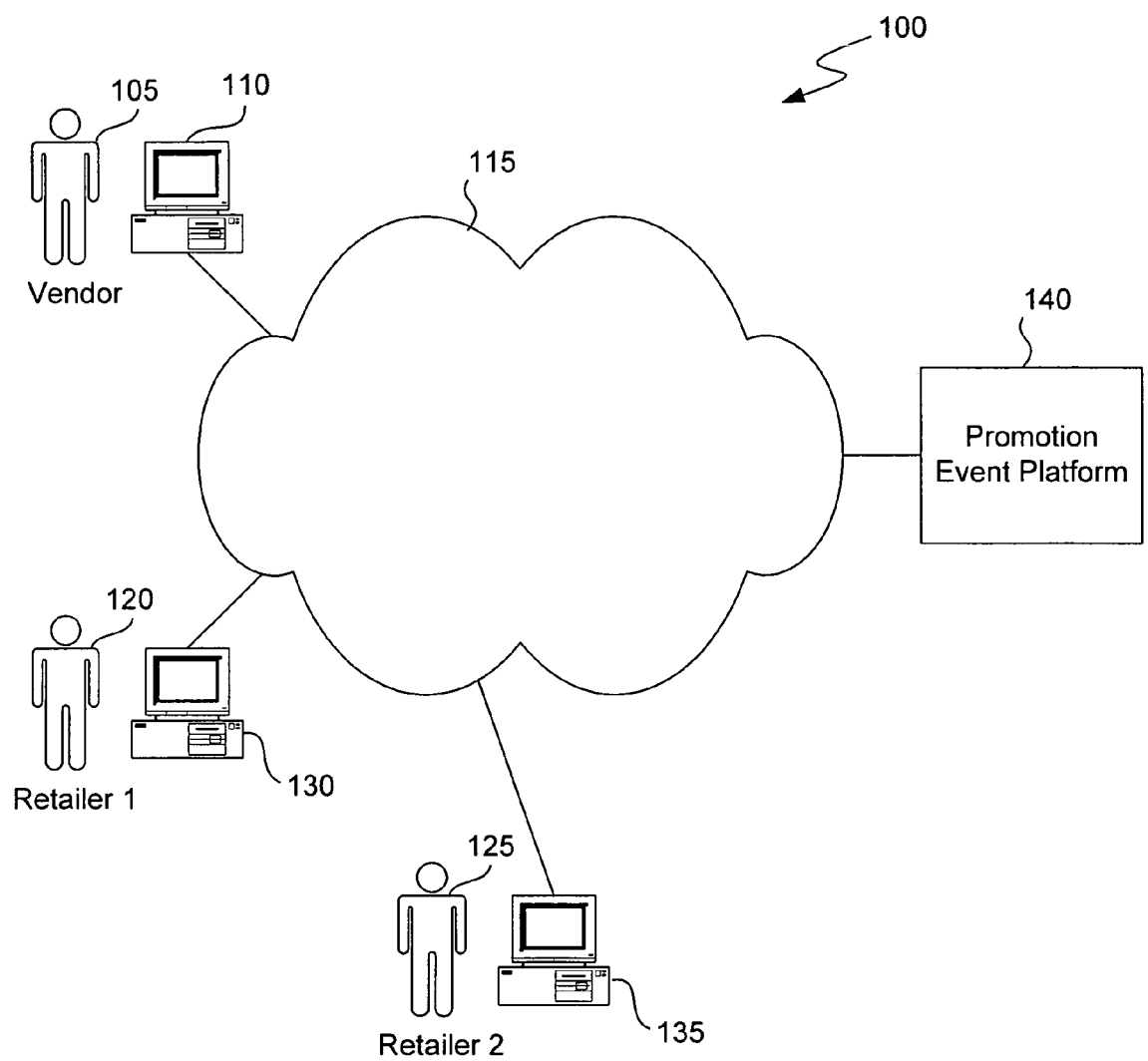
FIG. 1 shows a block diagram of a system 100 for managing promotion events, in accordance with one embodiment of the present invention.

Reference will now be made in detail to embodiments of the invention including the best modes contemplated by the inventors for carrying out the invention. Examples of these embodiments are illustrated in the accompanying drawings. While the invention is described in conjunction with these embodiments, it will be understood that there is no intention to limit the invention to the described embodiments. On the contrary, the intention is to cover alternatives, modifications, and equivalents as may be included within the spirit and scope of the invention as defined by the appended claim(s). In the following description, specific details are set forth in order to provide a thorough understanding of the present invention. The present invention may be practiced without some or all of these specific details. In addition, well known features may not have been described in detail to avoid unnecessarily obscuring the invention.

DETAILED DESCRIPTION OF THE EMBODIMENTS

The methods, apparatus and systems described herein enable the creation, communication, and storage of retail promotion events by and between trading partners. In one embodiment, the system is a hosted software application accessed through the Internet by users employing a computer with a web browser. Authorized users of this platform are assigned roles by the system administrator determining their access to business process rules engines, stored data, and workflow privileges within the system.

Generally, users of the platform including vendors, retailers, buyers, specialists and, in some embodiments, certain other designated individuals. As used herein, "trading partner" refers to any user of the platform, such as a vendor or a retailer, between whom communications regarding a promotion event are enabled. The promotion event can be requested, submitted, negotiated, and accepted between the trading partners.

A manufacturer generally has a vendor who provides a field sales function. This vendor can be an in-house representative of the manufacturer or an outsourced sales agent, or a wholesaler who purchases the items from the manufacturer and re-sells those items to a retailer. Thus, the manufacturer can be working with the wholesaler or an independent sales agent. In both cases, the manufacturer is often responsible for the promotion allowance in the promotion offered to the retailer. In some situations, when the vendor is a wholesaler, the vendor supplements the promotion monies offered by the manufacturer, augmenting the allowance offered to the retailer. As used herein, "vendor" refers to manufacturers, in-house or outside representatives of manufacturers, wholesalers, suppliers, distributors, brokers, sales agents, and other parties in the supply chain who are involved with distribution of products to retailers.

Within the platform, in one embodiment, the user is presented with several methods for creating, reviewing, and editing retail promotion events according to the formats, specific business process requirements, and authorized item catalogs of retailer trading partners. A user interface and embedded logic rules facilitate these promotion event management functions. The system supports online negotiations of the terms of promotion events between trading partners. Each promotion event is assigned a negotiation status to facilitate orderly workflow and version control.

In one embodiment, the system supports reporting outputs conforming to the paper layout of the vendor forms used to document retail promotion events. User authentication features allow users to contract with each other, actively affirming their will and intent to enter into the terms of negotiated retail promotion events through the use of digital signatures. The promotion events within the system are stored within a database, allowing users to search and sort these records according to the criteria chosen by the users.

FIG. 1 shows a system 100 for managing promotion events, in accordance with one embodiment of the present invention. System 100 provides one embodiment in which methods, described below, can be performed managing promotion events. Those skilled in the art should appreciate that the methods described below are applicable to other systems, within the spirit of the invention. In FIG. 1, a vendor 105 operates an associated computer 110 in communication with a data network 115. In addition, a plurality of retailers, including retailer 120 and retailer 125 also operate respective computers 130 and 135 in communication with data network 115, such as a local area network (LAN), wide area network (WAN), or the Internet. Generally, vendor 105 has an interest in communicating with the retailers 120 and 125 regarding promotion events, and vice versa.

In FIG. 1, a promotion event platform 140 is also in communication with data network 115. This promotion event platform 140 includes apparatus and methods, described below, for enabling and managing promotion events between the vendor 105 and retailers 120 and 125.

Figure 2:
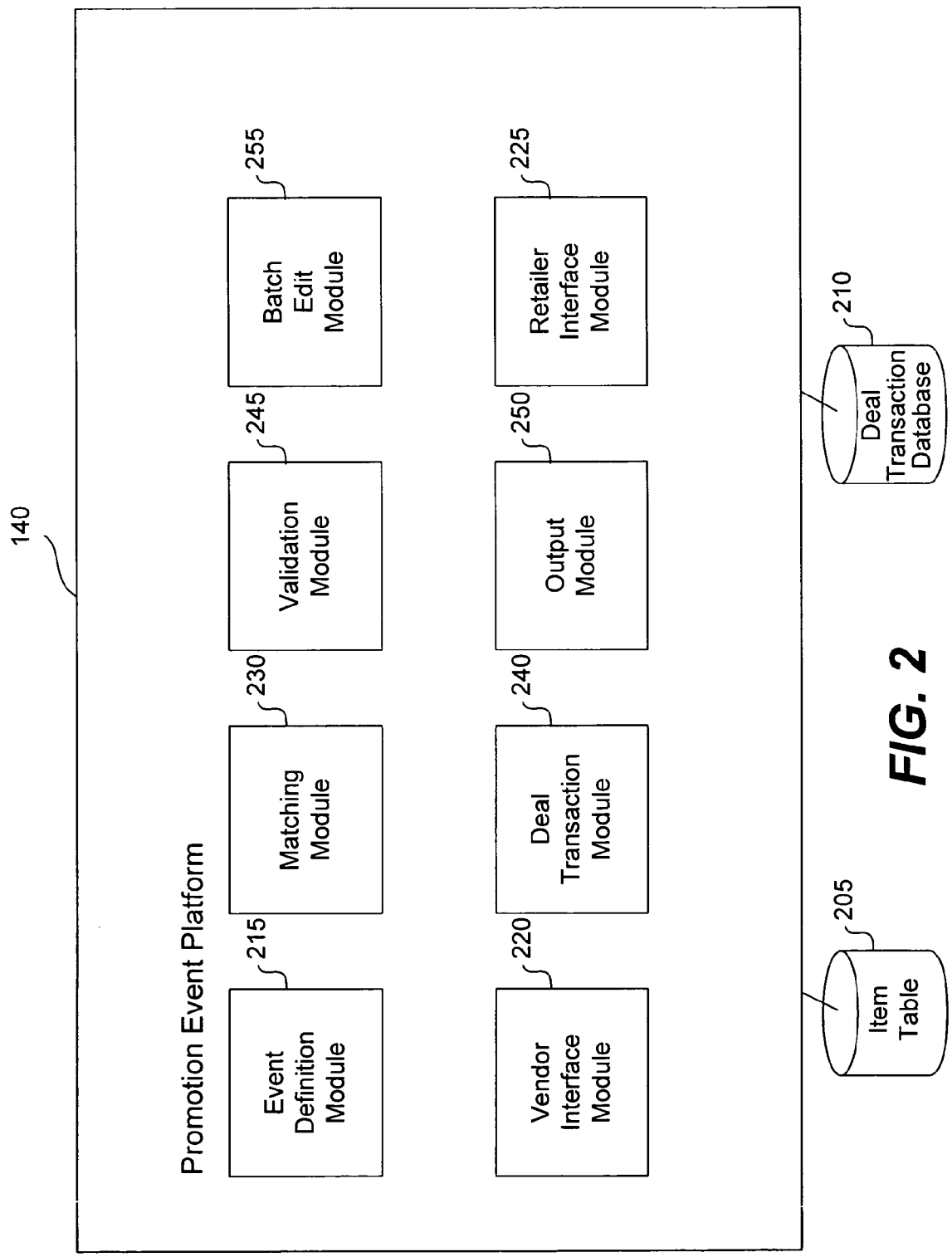
FIG. 2 shows a block diagram of apparatus of a promotion event platform 140, in accordance with one embodiment of the present invention.

FIG. 2 shows apparatus of a promotion event platform 140, constructed according to one embodiment of the present invention. The promotion event platform 140 includes a number of modules for performing functions and methods described in detail below. The promotion event platform 140 is in communication with an item table 205 and a deal transaction database 210. The item table 205 and deal transaction database 210 can be implemented using conventional storage techniques known to those skilled in the art, such as a database or other suitable storage medium. The item table 205 and database 210 can be situated internally or externally with respect to the platform 140, depending on the desired implementation. The functionality and usage of item table 205 and deal transaction database 210 are described below.

In FIG. 2, promotion event platform 140 includes an event definition module 215 which interacts with the vendor computer 110 through vendor interface module 220 to define a promotion event, in accordance with embodiments of the present invention. The event definition module 215 generally performs the function of defining one or more promotion events, including terms of the promotion events, as explained below.

In FIG. 2, a matching module 230 interacts with item table 205 to match items designated in a promotion event to a list of items stored in the item table 205. This list of items provides a reference for determining items authorized for purchase by one or more retailers. As explained below, in the process of creating a promotion event, the vendor user must designate to which items or promotional groups or product lines the promotion event applies. Through a suitable user interface, the vendor user is provided with an item file that sorts their items according to their standard business practice. In the process of creating the promotion event, the vendor user selects the applicable items. The matching module 230 functions as an item filter by comparing the selected items with the list of authorized items maintained for the designated retailer(s). The matching module 230 notifies the vendor user whether or not the items intended to be included within a promotion event have been authorized and/or discontinued by the retailer. This filter is capable of managing multiple item authorization lists by each division of a retailer who operates more than one division.

In FIG. 2, event definition module 215 interacts with the vendor computer 110 to define terms of a promotion event. Event definition module 215 provides these terms in fields of a promotion event record which is stored by deal transaction module 240 in deal transaction database 210, for later retrieval and processing. A validation module 245 validates fields in the promotion event record, that is, ensures that the fields of the generated promotion event record conform to requirements of a deal sheet associated with the retailer. The vendor interface module 220 interacts with the vendor computer 110 as necessary to ensure that the terms defined in the promotion event and entered in the fields of the promotion event record conform to the deal sheet requirements. Eventually, when the fields do conform, deal transaction module 240 stores the promotion event record as a deal in deal transaction database 210. The retailer interface module 225 provides access to the stored deal for one or more retailers designated in the deal to read and then negotiate the deal with the vendor.

In FIG. 2, promotion event platform 140 further includes an output module 250 to provide flexible output options. Output module 250 is configured to output the stored deal in any of a variety of formats such as a screen display, .pdf file or .xls file as desired by the recipient. In one embodiment, as described below, a user interface accessible by the vendor computer or retailer computer includes a "preview" button. When this button is selected, the data in the promotion event record being created, negotiated, or edited, the data of the record is formatted in the designated format for on-screen viewing and printing. In some instances, this designated format is the appearance and structure of a conventional deal sheet. These flexible output options enable the promotion event platform 140 to work with any of the legacy documents and/or systems employed by any of the participants in the promotion event.

In addition, in FIG. 2, a batch edit module 255 provides batch editing of a plurality of promotion event records stored in deal transaction database 210, using techniques described below. Other methods and functions performed by promotion event platform 140 throughout the creation, negotiation, and documentation of promotion events, in accordance with embodiments of the present invention, are described below.

Figure 3:
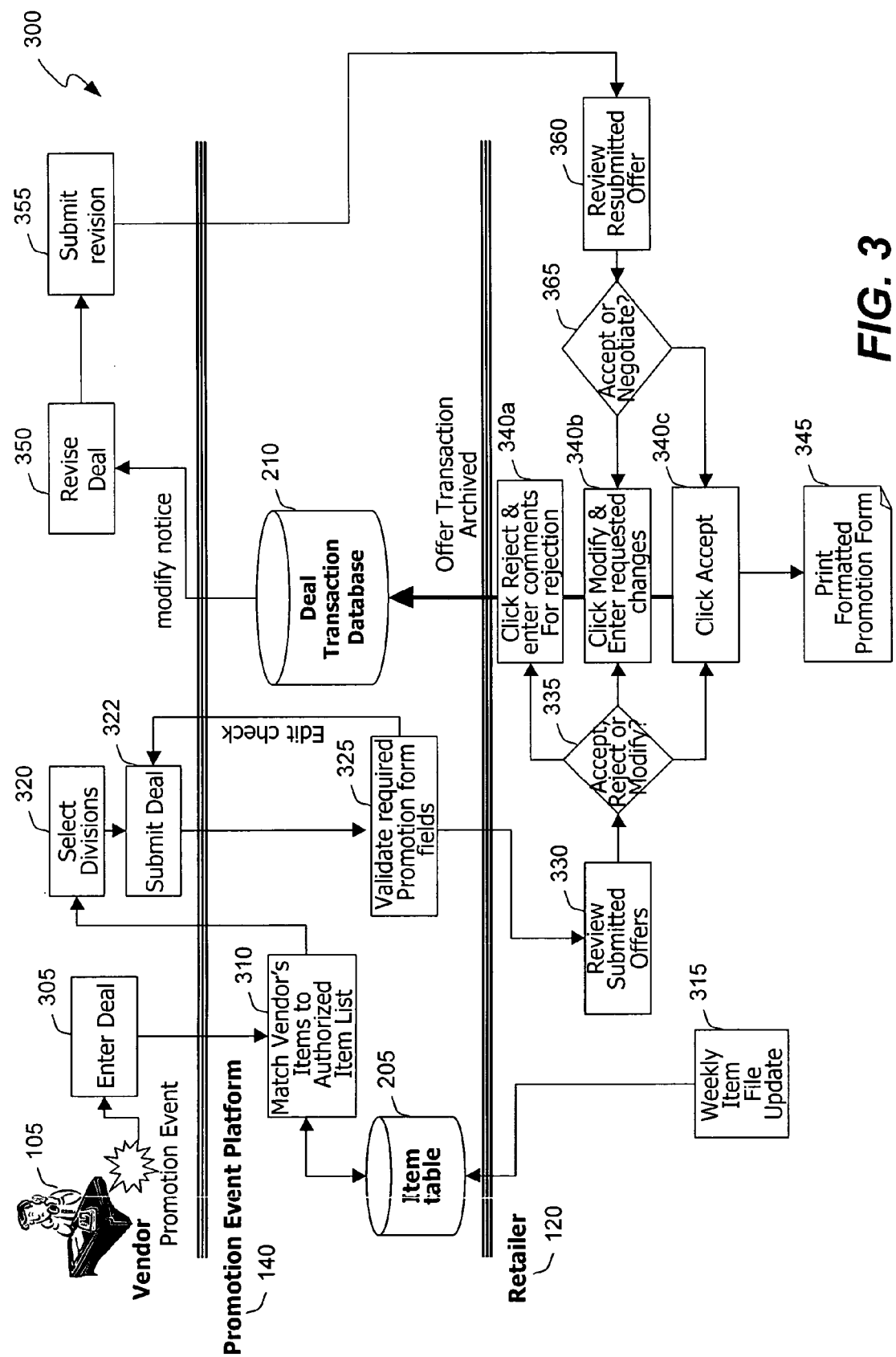
FIG. 3 shows a flow diagram of a computer-implemented method 300 for managing a promotion event, performed in accordance with one embodiment of the present invention.

FIG. 3 shows a flow diagram of a computer-implemented method 300 for managing a promotion event, performed in accordance with one embodiment of the present invention. FIG. 3 is described with reference to FIGS. 1 and 2. As shown in FIG. 3, vendor 105 and retailer 120, shown in FIG. 1, interact with the promotion event platform 140 as needed to facilitate definition, negotiation, and documentation of promotion events as desired. In step 305, the promotion event platform 140 generates a user interface accessible by vendor computer 110 to interact with event definition module 215 through vendor interface module 220 to define the promotion event. Examples of suitable user interfaces are described below. Through these user interfaces, the vendor 105 interacts with event definition module 215 to establish a definition of the terms of a promotion event. The definition of the terms of a promotion event provides a data model which informs the construction of deal transaction database 210 upon which the platform 140 operates.

The promotion event definition generally includes: (1) an event description, (2) a designated items description, and other elements as terms. Other elements or terms in the promotion event definition generally include: (3) a category or classification as explained below, (4) a name of the promotion event such as "ad book," "savings book," "coupon book," or "frequent shopper card," (5) a performance period including start and end dates for the promotion event, (6) an allowance amount, (7) a basis for calculation of the allowance amount, such as per-transaction, flat amount, periodically, or per-item, (8) a method of payment, such as by check, deduction, off-invoice, etc., (9) a sponsor, and (10) a selection of one or more retailers as trading partners for the promotion event. Often, the promotion event definition further specifies (11) one or more divisions within the selected retailers. Element (7), the basis for the amount, can be per transaction, as a flat amount per item, or set according to other schemes known to those skilled in the art.

In the promotion event definition, the "sponsor" element indicates to the retailer the identity of the individual or entity responsible for paying the cost of the promotion event and the identity of the manufacturer's representative or agent who is authorized by the manufacturer to present and negotiate the promotion on behalf of the manufacturer. Often, the sponsor is the manufacturer. In some instances, the sponsor is the wholesaler. The "divisions" element of the promotion event definition generally designates physical or geographic locations in which the retailer organizes its stores, for instance, northern California, Seattle, northeast, or a specific warehouse where designated items are stored. When these terms of the promotion event are defined, the event definition module 215 of platform 140 interacts with deal transaction module 240 to enter these terms in fields of a promotion event record established for that promotion event. The promotion event record is stored by deal transaction module 240 in deal transaction database 210. As will be described below, a promotion event may be further modified throughout its lifetime in the promotion event platform 140 with any of a variety of status indicators which specify, for example, a stage of negotiations between the relevant parties with regard to the particular deal.

Embodiments of the present invention provide for the organization of promotion events into categories or classifications. These classifications include volume-based events, price-based events, display-based events, advertisement-based events, and cost-based events. Cost-based events include promotion events wherein the vendor lowers the price of designated items for the retailer, and the retailer has no follow-on performance burden other than buying the designated items. The categories are organized into a hierarchy of categories. This classification scheme enables a commonsense generalizing of the data for use by vendors and manufacturers. Within the retail supply chain, it is common for different retailers to use different synonymous terms to describe the nature or terms of a promotion event. Each retailer commonly requires its vendors to use the specific terms that the retailer has adopted. Conversely, different vendors commonly use different synonymous terms to describe the nature or terms of a promotion event; however, in most cases the vendor is unable to communicate with their retailers using the specific terms adopted by the vendor. For example, "advertising-based events" may variously be described by members of the retailer supply chain as "ads", "ad deals", "ad events", "ad guide events", "advertisements", and "features" to name a few of the phrases commonly used to refer to an advertising-based event. Therefore, the use of the classification scheme of embodiments of the invention enables the vendor to minimize the complexity associated with the need to use the synonyms of their retailer trading partners. Additionally, the classification hierarchy enables the trading partners to elegantly sort and retrieve any records ordered within the classification scheme.

In FIG. 3, in step 310, matching module 230 receives the designated items description of the promotion event definition from event definition module 215 and performs a matching operation with a list of authorized items for purchase by retailer 120. This item list is stored in item table 205, with which matching module 230 communicates. This matching function of matching module 230 ensures that, from the outset, the items to be supplied from the vendor as part of the promotion, can be sold by the retailer 120 or specific division of retailer 120, as explained below. In step 310, when any items in the designated items description do not match the authorized item list, a message is provided to the vendor computer indicating that those designated items cannot be part of the promotion event. This message is generally displayed as textual or graphical output as part of a suitable user interface accessed by the vendor computer 110. Through a suitable user interface, the vendor is able to revise the designated items description accordingly. By the same token, a message can be provided to the vendor computer indicating that there is a match between certain designated items in the promotion event definition and items in the item list stored in item table 205. In another embodiment, the item list includes items already in stock at one or more retailer divisions, and a message to the vendor requests that the vendor include those items in the designated items description. For example, a user interface generated for access by the vendor computer 110 includes text or an icon next to such items indicating they are "in stock" at the retailers identified in the promotion event definition. Also, in one embodiment in which specific divisions are selected, different item lists are maintained for the particular divisions. The matching module can match the designated items with item lists corresponding to the selected divisions in the promotion event definition.

Generally, the item list in item table 205 is initially established between the retailer 120 and promotion event platform 140 before the vendor 105 is allowed to access the platform 140 to define the promotion event. In one example, in step 315, retailer 120 submits a periodic item list update, for example, on a weekly or a monthly basis, to promotion event platform 140 to update item table 205 with a current list of items authorized for sale by retailer 120.

In FIG. 3, in step 320, the vendor interface module 220 of promotion event platform 140 interacts with vendor computer 110 to receive a selection of divisions within the designated retailer or retailers. In one embodiment, the matching operation of step 310 and division selection of step 320 are performed together using one or more user interfaces.

In FIG. 3, following item matching in step 310 and division selection in step 320, the vendor 105 submits the promotion event to the platform 140 for validation, in one example, by clicking a "Submit" button on a user interface. Validation module 245 incorporates a logic layer in the form of a business process rules engine, which performs field validation on the promotion event record in step 325. The validation operation provided by validation module 245 includes: (1) ensuring that the vendor completes all of the required fields corresponding to the deal sheet, (2) performing calculations to automatically complete certain fields, and (3) ensuring that the data entered in the fields of the promotion event record conform to the requirements of a deal sheet associated with the retailer. One example of a suitable deal sheet is described below. The promotion event platform 140 interacts with vendor computer 110 as needed to ensure that the terms defined in the promotion event do conform to the deal sheet requirements.

As shown in FIG. 3, when the fields do not conform to the deal sheet requirements, an edit check message, for example, in the form of a text or graphical output on the user interface accessed by the vendor computer 110, is output. This edit check message indicates to the vendor that editing of the terms in the promotion event record is needed before the promotion event can be submitted to retailers. In step 325, when the validation module 245 validates that the fields in the promotion event record do indeed conform to the deal sheet requirements, the deal transaction module 240 in promotion event platform 140 ensures that the promotion event record is stored as a deal in the deal transaction database 210:

When the promotion event record is validated and stored as a deal, a status indicator associated with the deal is designated as being "submitted", or having a "submitted status", in step 322. This status indicator can be implemented as desired, for example, as a flag attached to the promotion event record, or stored in a table in the deal transaction database 210 or other suitable storage medium with a reference to the stored deal. When read access is provided to the retailer computer 130, the retailer interface module 225 of promotion event platform 140 generates a suitable user interface, as described below, identifying the deal and provides a graphical or textual representation of the status indicator, such as "submit" or "submitted". In one example, such a user interface is accessed over data network 115 by browser software on the retailer computer 130.

In FIG. 3, when the deal is designated as having the submitted status, in step 330, the retailer interface module 225 of promotion event platform 140 provides read access to the stored deal for the retailer computer 130 over data network 115, generally through a user interface generated by retailer interface module 225 and accessible by the retailer computer 130. Through this user interface, the retailer 120 can review the terms of the stored deal and enter into negotiation with the vendor regarding the stored deal. In step 335, the retailer interface module provides the retailer computer 130 with a number of actions to take in negotiating the stored deal. These selections for deal negotiation include accepting the deal, rejecting the deal, modifying the deal, and possibly other deal negotiation selections or messages permitted for deals having a "submitted" status. On the other hand, when the status of the deal is "rescinded," as described below, the retailer can accept or reject the rescission. When selections are received through the user interface, the selections are processed by the deal transaction module 240 in promotion event platform 140. These various selections are referred to herein as deal negotiation messages to be processed by deal transaction module 240.

In FIG. 3, one of the selections for a deal negotiation message is a "reject" selection in step 340a. Other selections include "modify", in step 340b, and "accept" in step 340c. When these selections are received by deal transaction module 240 through retailer interface module 225, the status indicator for the stored deal under negotiation is designated as having an appropriate status, as described below. For instance, when "modify" is selected, the stored deal is designated as having a modified status. Then, when a vendor views the deal status through an appropriate user interface, the vendor will see the modified status and interpret this status as meaning that the retailer has viewed the submitted deal and requested modification of the terms of that deal. Similarly, when the "reject" selection is received, the stored deal is designated as having a rejected status. Also, in step 340a, when the reject button is selected, a text entry field on the user interface accessed by the retailer allows the retailer to enter comments regarding the stored deal, in some instances, including requested changes or specific terms objected to. When "modify" is selected, a text entry field in the user interface allows the retailer 120 to enter requested changes regarding the stored deal. These comments and requested changes are received by deal transaction module 240 through retailer interface module 225 for later viewing by the vendor. In step 340c, when the "accept" selection is received from the retailer computer 130, in step 345, the stored deal can be printed or otherwise output in an appropriate format. In one embodiment, when the "accept" selection is received, the deal is designated as having a complete or accepted status.

In step 350 of FIG. 3, when the deal negotiation selection or message has been received by deal transaction module 240, the status of the stored deal and deal negotiation message, for instance, "reject" or "modify", is communicated to the vendor computer 110. In one embodiment, as described below, a user interface is generated with information identifying the stored deal and status of the stored deal, and is accessible by the vendor computer over the data network 115. Through this user interface, the vendor 105 can view the status of the rejected, modified or otherwise negotiated deal. In addition, the vendor computer is provided edit access to the stored deal, through the user interface, to modify or otherwise provide input regarding the stored deal as desired.

In step 355, the vendor can click a "submit" button on the user interface to submit any revisions to the stored deal through vendor interface module 220. These revisions are received by deal transaction module 240 and then entered in the stored deal in deal transaction database 210. Those skilled in the art will appreciate that any revisions received in step 355 can be stored in various manners, including storing the revisions as a separate document, or as a subsequent version of the earlier stored deal. In step 360, following the submission of revisions, the retailer computer 130 again receives read access to the stored deal with the submitted term revisions for viewing. Again, this is often provided by a user interface generated by retailer interface module 225 and accessible by the retailer computer 130. Often, the status indicator of the deal is then designated as in "resubmitted" status. In step 360, through the generated user interface, the retailer can review the resubmitted deal and decide how to proceed in step 365, similar to step 335. When the retailer wishes to continue negotiation of the stored deal, the process flow described above with respect to steps 340a, 340b, 350, 355 and 360 is repeated. Any number of iterations of these process steps can be performed, as needed to reach agreement between the retailer and vendor regarding the deal. Eventually, when agreement is reached, the "accept" selection in step 340c is made, followed by outputting of the stored deal in a designated format in step 345.

Those skilled in the art should understand that the process flow described above with respect to FIG. 3 can be initiated by the vendor computer or retailer computer. In one embodiment, before the promotion event is defined in step 305, the retailer 120 accesses the promotion event platform 140 through retailer interface module 225 and enters a selection in a generated user interface requesting that the vendor proceed with interacting with the event definition module 215 to define the promotion event. Alternatively, the retailer 120 accesses the promotion event platform 140 through retailer interface module 225 and enters a selection in a generated user interface to advise a vendor or vendors that the retailer is able to carry out a specific promotion event, such as the placement of a cooperative advertisement. In one embodiment, the retailer is also allowed the opportunity through the user interface generated by retailer interface module 225 to enter one or more terms the retailer requests for the promotion event. These terms are then communicated to the vendor computer 110 through an appropriate user interface.

Figure 4A:
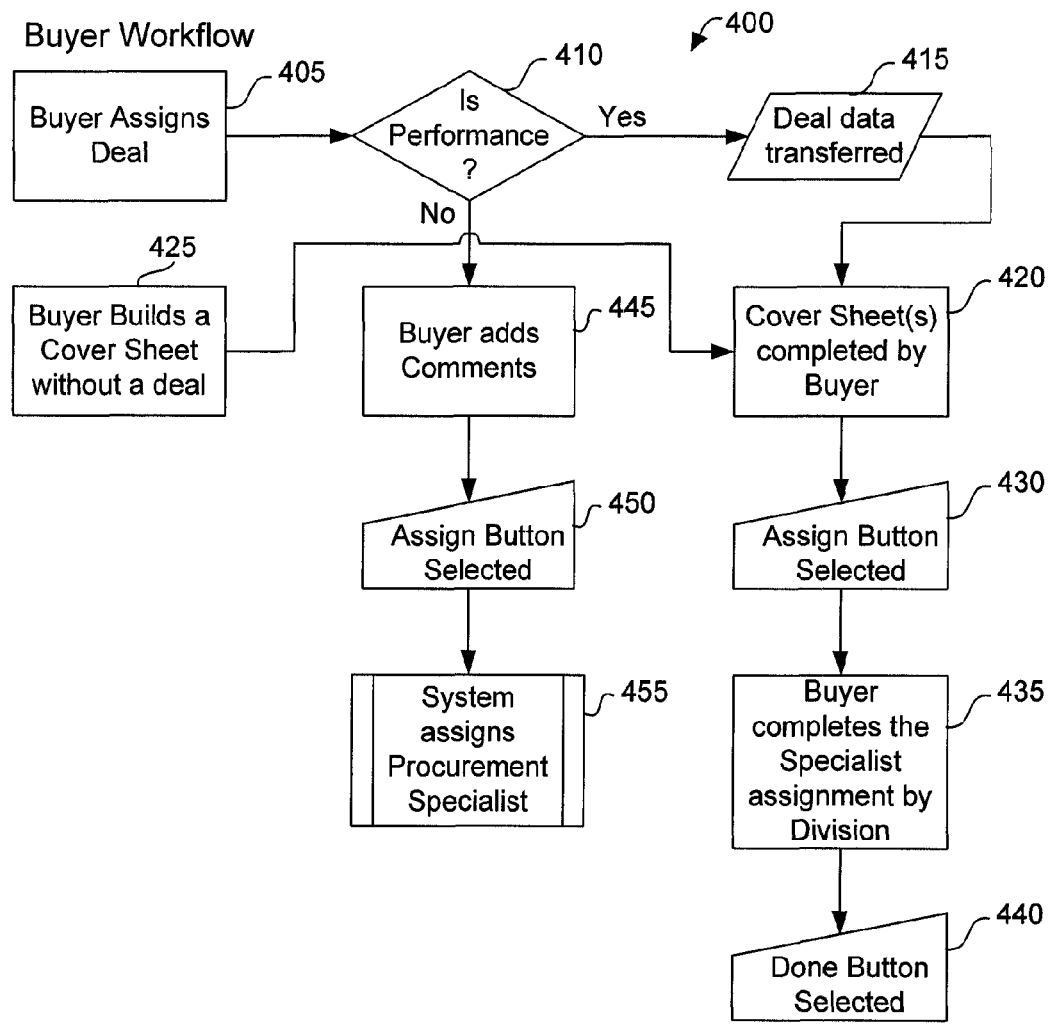
FIG. 4A shows a flow diagram of a method for managing a plurality of promotion events, in the context of a buyer workflow, performed in accordance with one embodiment of the present invention.

FIG. 4A shows a method for managing a plurality of promotion events, in the context of a buyer or merchandiser workflow, according to one embodiment of the present invention. The buyer or merchandiser generally has negotiated the promotion event on behalf of the retailer. The method 400 begins following the acceptance of a deal in step 340c of FIG. 3 and inputting the printed deal in a designated format in step 345c. The status indicator of the deal is designated as being "assigned." In FIG. 4A, in step 405, the buyer assigns the deal. Then, in step 410, it is determined whether the type of the deal is performance based or non-performance based. "Performance" generally refers to the retailer being required to take some affirmative action, above and beyond ordering the product, to earn the allowance defined in the deal. The performance or non-performance basis of the deal is dictated by the event description in the promotion event definition.

In FIG. 4A, in step 415, when the deal is performance based, the deal data, that is, terms of the deal and other information in fields of the stored deal are transferred to a cover sheet, pre-populating certain data fields within the cover sheet. Following step 415, in step 420, a cover sheet is completed by the buyer. In some embodiments, in step 425, the buyer builds the cover sheet before the deal has been completed, using output module 250 of FIG. 2. The cover sheet assigns a number to the deal and provides other tracking information for the deal.

In FIG. 4A, following completion of the cover sheet by the buyer, in step 430, an "assign" button is selected by the buyer on an appropriate user interface. Generally, when this assign button is selected, the stored deal is designated as having an assigned status. In step 435, the buyer completes the assignment of the deal to one or more promotion specialists, by division as indicated in the deal and on the cover sheet. In other situations, such as when the terms of the promotion do not require any affirmative action on the part of the retailers other than the purchase of the product, the specialist is a procurement specialist. These specialists are generally responsible for re-keying the data from the accepted deal into a legacy system used by the retailer 120. In step 440, when a "done" button is selected by the buyer through the appropriate user interface, the deal is assigned and processed. In one embodiment, the status indicator of the deal is accordingly set as "assigned and processed."

In FIG. 4A, returning to step 410, when it is determined that the deal is not performance based, in step 445, the buyer can add comments to the accepted deal. Then, in step 450 when an assign button is selected by the buyer through an appropriate user interface, similar to step 430, the promotion event platform 140 assigns the deal to a procurement specialist in step 455. The procurement specialist handles the clerical work for non-performance based deals. The procurement specialist conveys data from the deal into a procurement management system operated by the retailer.

Figure 4B:
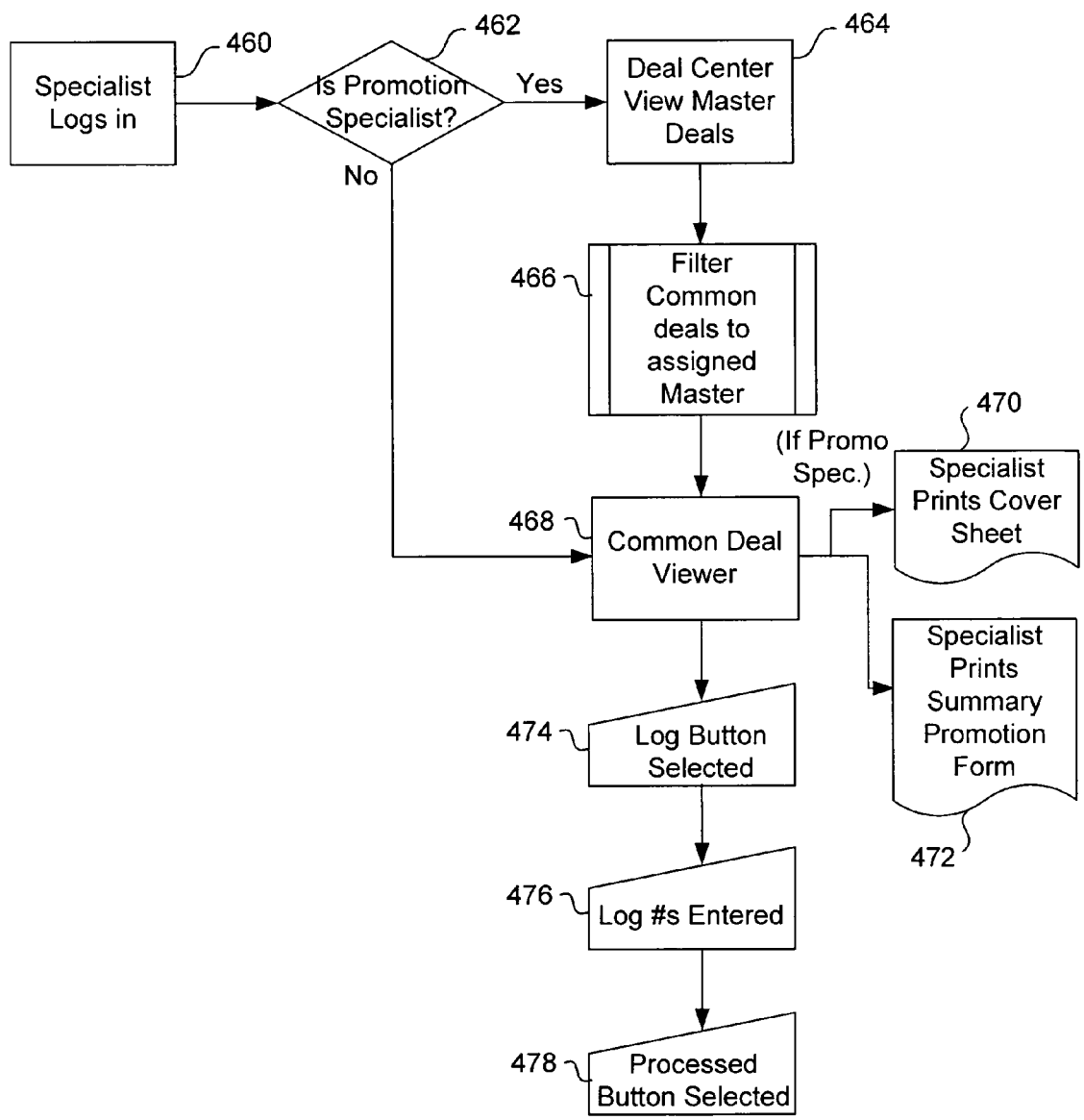
FIG. 4B shows a flow diagram of a method for managing a plurality of promotion events, in the context of a specialist workflow, performed in accordance with one embodiment of the present invention.

FIG. 4B shows a method for managing a plurality of promotion events, in the context of a specialist workflow, according to one embodiment of the present invention. The specialist is designated by the retailer as the recipient of deal flow from a certain buyer. In step 460, the specialist logs into the promotion event platform 140 through an appropriate user interface. In step 462, it is determined whether the specialist is a promotion specialist. When the specialist is a promotion specialist, in step 464, the specialist is granted a read access privilege to view a batch of common deals, referred to herein as a "master deal." Then in step 466, using the master deal, common deals can be filtered to the assigned master deal. From step 466, the method proceeds to step 468, in which a common deal viewer is provided for the promotion specialist.

In FIG. 4B, returning to step 462, when the specialist is not a promotion specialist, for instance, a procurement specialist, the method also proceeds to step 468 wherein the procurement specialist can view the common deal using an appropriate user interface. From step 468, when the specialist is a promotion specialist, the promotion specialist can print a cover sheet in step 470, and can also print a summary deal sheet, or a retailer's specific promotion form in step 472, using output module 250 as shown in FIG. 2. These printouts can then be used by finance management personnel to determine how to bill vendors for the deal. Returning to step 468 of FIG. 4, a log button can then be selected in step 474. Responsive to the log button being selected in step 474, log numbers can be entered by the specialist in step 476. A processed button can then be selected in step 478, indicating that processing of the deal is done. In particular, the status indicator of that deal is designated as having a negotiation status of "Processed" and a workflow status of "Complete," and appears in Complete lists or boxes of user interfaces viewable by the retailer or vendor. The log button and processed button can be presented to the specialist through appropriate user interfaces.

Figure 5:
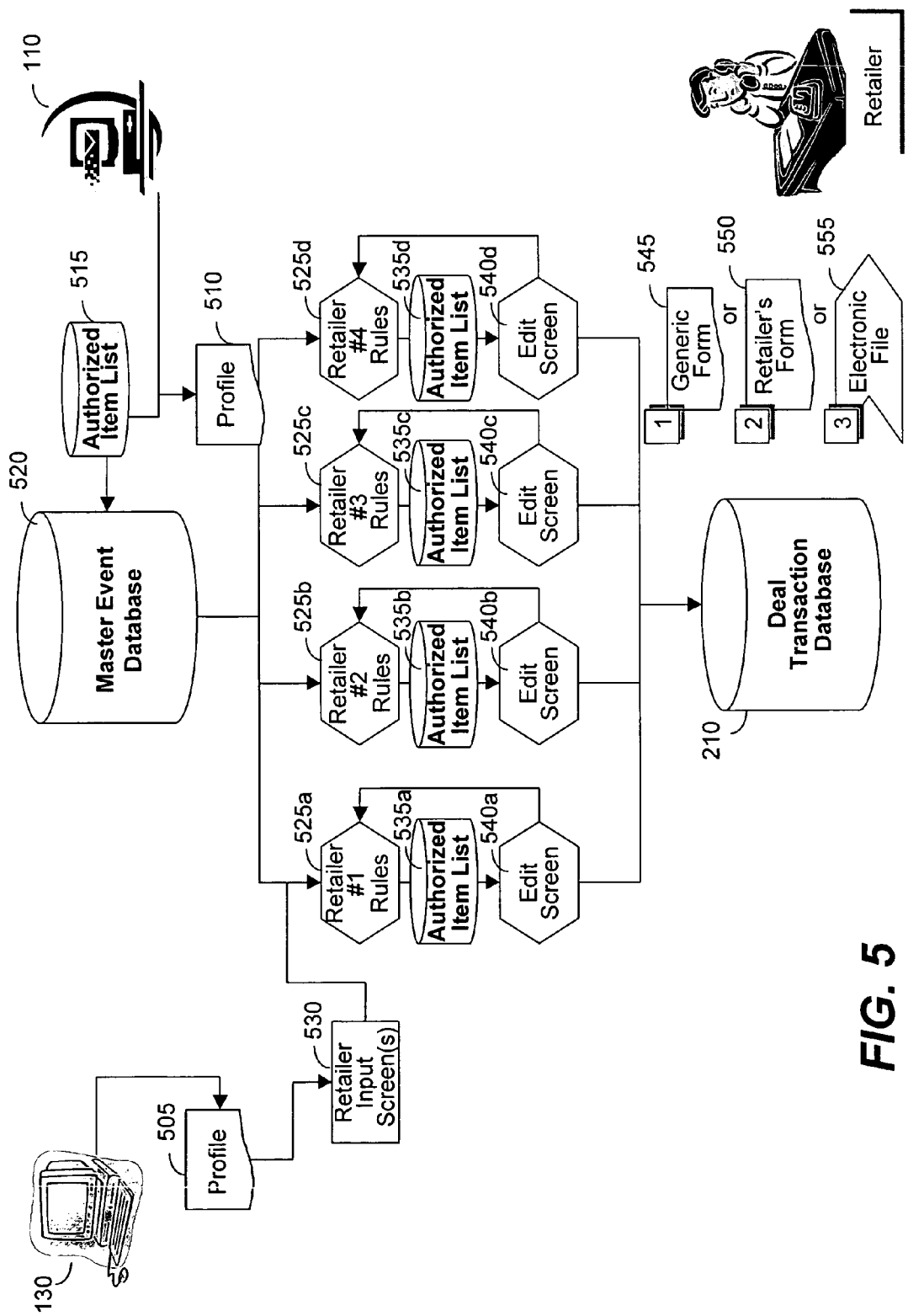
FIG. 5 shows a block diagram of a system for managing promotion events between one or more retailers and a vendor, using promotion event platform 140, in accordance with one embodiment of the present invention.

FIG. 5 shows a block diagram of a system for managing promotion events between one or more retailers and a vendor, using the promotion event platform 140 of FIG. 2. In FIG. 5, the retailer can complete a profile 505 using a user interface generated by retailer interface module 225. Similarly, a vendor 105 can complete a profile 510. The profile describe those terms of the promotion event that may be required by more than one division of a retailer or by more than one retailer. The profile uses a commonsense generalized lexicon of terms that are readily intelligible to the vendor instead of the a series of documents using the specific synonymous terms required by each retailer or by the individual divisions or operating banners of a retailer operating more than one division or under more than one trade name. In this embodiment, the vendor 105 is also allowed to submit an authorized item list 515, listing items the vendor is able to supply, regardless of the particular promotion event. This authorized item list is then stored in a master event database 520 or other suitable storage medium for later reference.

In FIG. 5, in one embodiment, four sets of business logic rules 525a-d for performing the matching operation of matching module 230 are established. In one example, each set of logic rules corresponds to a different division of the retailer. Following the inputting of information through user interfaces in step 530, the business logic rules are applied to perform the matching step of 310 of FIG. 3 using a list of authorized items for each respective division. These item lists 535a-d are shown in FIG. 5 as stored in separate repositories, however, those skilled in the art should appreciate that the item lists may be organized and stored as desired for the particular implementation, for example, in a single item table as shown in FIG. 3.

In FIG. 5, then in steps 540a-d, edit screens are presented to the vendor as needed in appropriate user interfaces. The vendor uses these edit screens in order to make such amendments and revisions to the draft promotion as may be desirable following the comparison of the draft promotion and the authorized item filters 535a-d. For example, the authorized item filters may reveal that a particular item is authorized for purchase by some, but not all of a retailer's divisions; therefore it is desirable to delete the unauthorized item from the promotion forms pertaining to those divisions that are not authorized to purchase the item. Following these edit screens, in which steps 320 and 325 of FIG. 3 are performed, the promotion event record is stored as a deal in deal transaction database 210. Later in processing, the stored deal can be output in a format as desired by the retailer, such as a generic form 545, a retailer's designated format 550, or an electronic file such as a PDF or XLS format 555.

Figure 6:
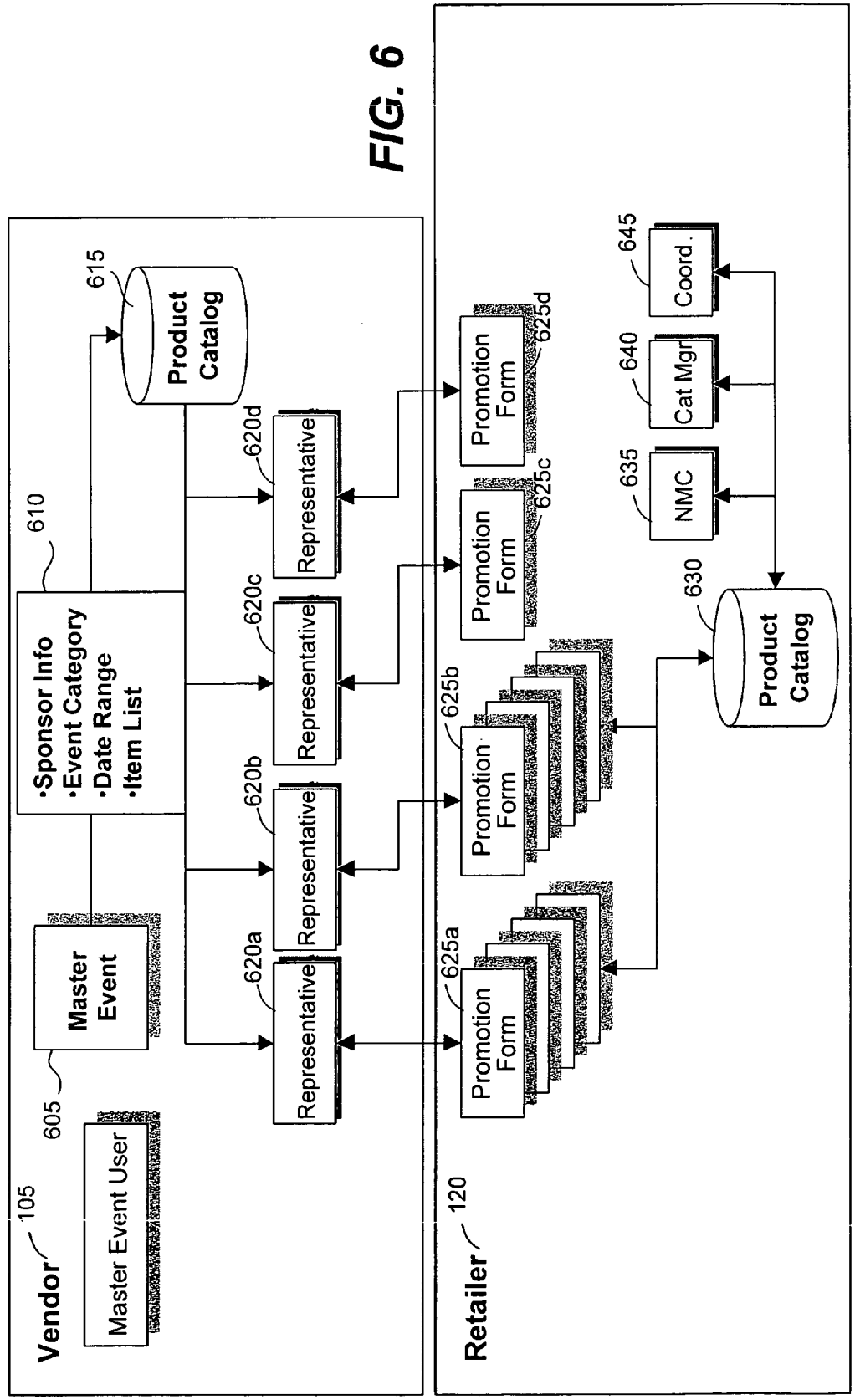
FIGS. 6 and 7 show block diagrams of system architecture showing the relationships between a vendor 105 and a retailer 120, in accordance with one embodiment of the present invention.

FIG. 6 is a block diagram of a system architecture showing the relationships between a vendor 105 and a retailer 120, according to one embodiment of the present invention. In FIG. 6, the vendor uses the promotion event platform 140 as explained above to define a master event, in accordance with embodiments of the present invention. This master event 605 is defined to include a number of terms 610 including sponsor information, a category for the event, a date range or time period, including start and end dates, and a description of designated items to which the promotion event applies, in the form of an item list. These items designated as part of master event 605 can be retrieved from a first product catalog 615 accessible by the vendor 105. Representatives 620a-d of the vendor can access the master event definition and product catalog 615. These representatives 620a-d can then interact with promotion event platform 140, as described above, to generate deals. When the deal is negotiated and completed, the deal can be output in the desired format, such as retailer specific promotion forms 625a-d, as shown in FIG. 6. In one embodiment, each form 625a-d corresponds to a different division of retailer 120. These promotion forms can be structured according to a product catalog 630 managed by retailer 120.

In FIG. 6, a merchandiser (also known as a category manager) 635, catalog manager 640 and coordinator 645 can all access the product catalog 630. By referring to the product catalog 630, each of these workers can affirmatively determine that the vendor has offered a promotion allowance only for those items that are authorized for purchase within a given division. Alternatively, by comparing the promotion form to the catalog, each of these workers can also determine whether or not the vendor has offered a promotion allowance for all of the items that make up a particular product line or brand, some of which items are promoted on the specific promotion form. For example, if a retailer carries five flavors of an item in Division A and only four of the five flavors in Division B, reference to the catalog will show whether or not the vendor has mistakenly attempted to promote all five flavors at Division B. Conversely, if the vendor has only offered a promotion to Division A for only the four authorized items that may be purchased by Division B, reference to the catalog shows that one additional item within the line may be promoted at Division A.

In FIG. 6, the user is able to manage the presentation of the promotion event to individual divisions of a retailer operating multiple divisions. The data in the promotion event record is normalized for output to each of the various retailers or divisions in promotion forms 625a-d. The merchandisers of those retailers are then only allowed to view only the portions of the master set of records that are accessible by the retailer or division in question. The promotion event platform 140 integrates the requirements of multiple retailers and, as applicable, the multiple divisions within the retailer.

Figure 7:
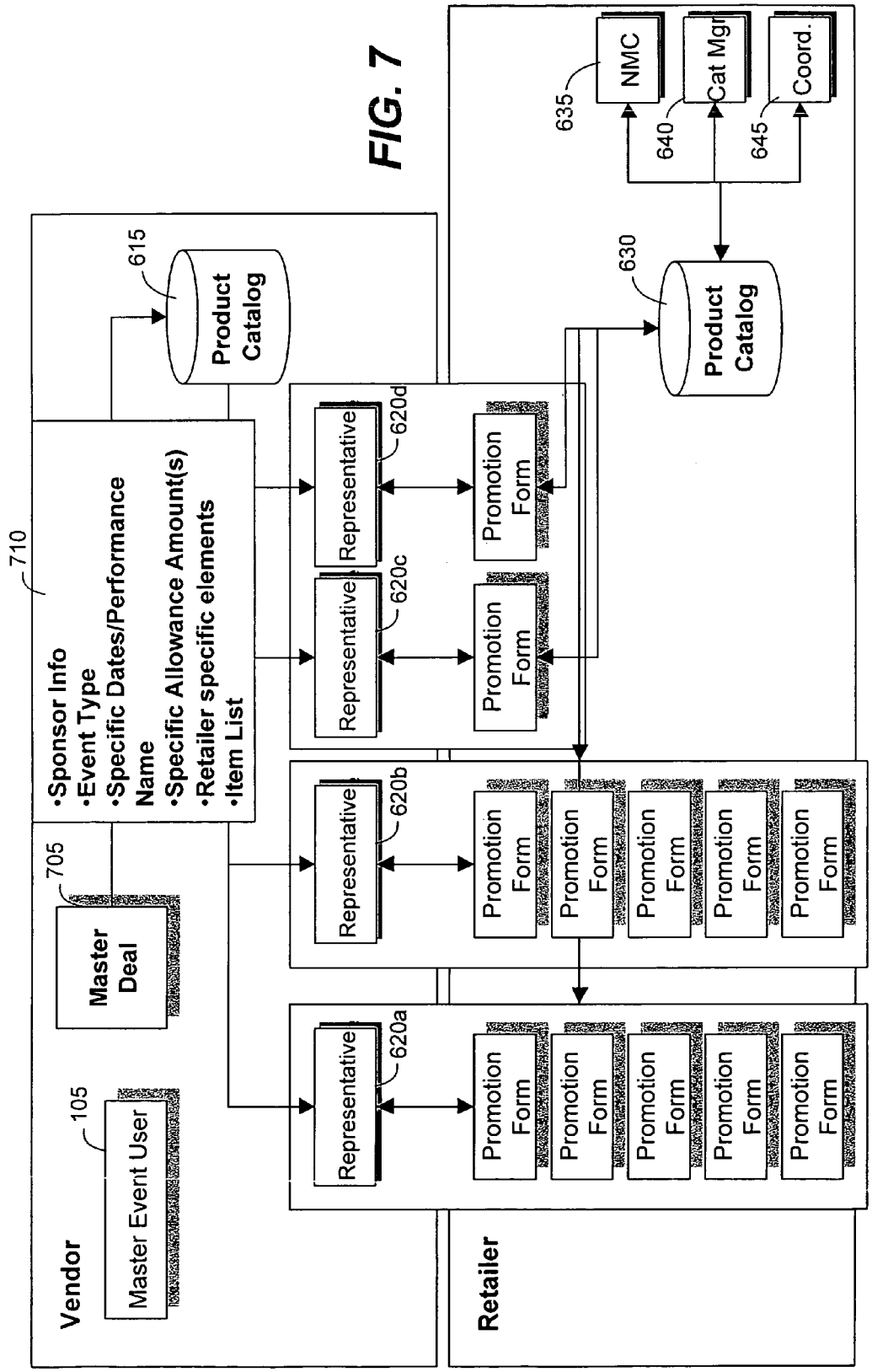

FIG. 7 shows a similar system architecture as FIG. 6. In FIG. 7, a master deal 705 is defined to include additional terms 710 to those in master event 605. The master deal 705 includes data fields that are in common across any number of common deals with one or more retailers. Such additional terms include an event description for the master deal 705, specific dates, including a start date and an end date for performance of the master deal 705, a name of the master deal, specific allowance amounts, and other retailer specific elements. In one embodiment, the user is presented with a "Sponsor screen" interface showing the fields of master deal 705. Thereafter, the user is presented with a "Representative screen" interface showing the remaining data fields that are unique to any of the retailers to whom the Master Deal is offered.

Figure 8:
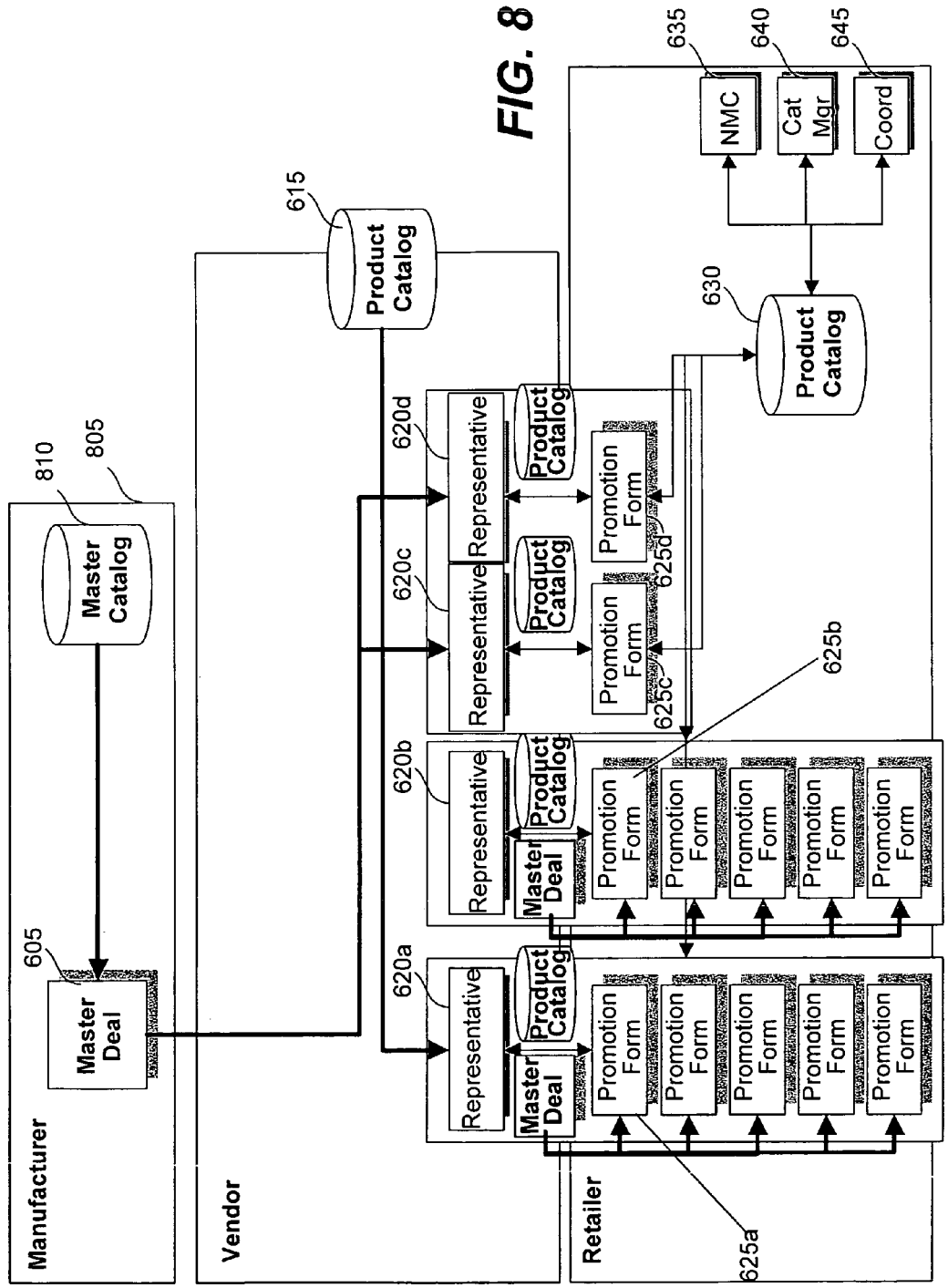
FIG. 8 shows a block diagram of a system architecture showing the relationships between a manufacturer 805, vendor 105 and retailer 120, in accordance with one embodiment of the present invention.

FIG. 8 shows a similar system architecture as FIGS. 6 and 7, incorporating many of the same elements shown in FIGS. 6 and 7. However, in FIG. 8, a manufacturer layer 805 is responsible for defining the master deal 605, using a master catalog 810. In FIG. 8, a manufacturer may notify other members of its demand chain, including a network of fields sales representatives, outsourced sales agents, and wholesalers of the terms of any deal it wishes to sponsor. Thereafter, these sales force representatives may use the other embodiments, as applicable, to complete a promotion event.

The promotion event platform 140 designates to each user a Log In ID, a Password, and a business process role such as vendor, retailer, buyer, procurement specialist, or promotion specialist. The promotion event platform 140 also designates privileges to certain users, as commercially appropriate, to access, read, write, modify, or otherwise change the negotiation status of their promotion event records and documents.

FIGS. 9-21 show examples of user interfaces generated by the promotion event platform 140 for access and viewing by users of the platform, in accordance with embodiments of the present invention. These user interfaces can be generated at various stages through the processing described above in managing promotion events. In one embodiment, the promotion event platform 140 is implemented as a website with associated server(s) hosting promotion event management application software and a system database. Users can use a computer with an Internet connection and web browser to access the platform 140 over the data network 115, as shown in FIG. 1. Users log in to the website, authenticating their identities with a Log In ID and a Password or, alternatively, using any other currently feasible embodiments for securely authenticating the identity of any trading partner using the system to author or access a promotion event record.

Figure 9:
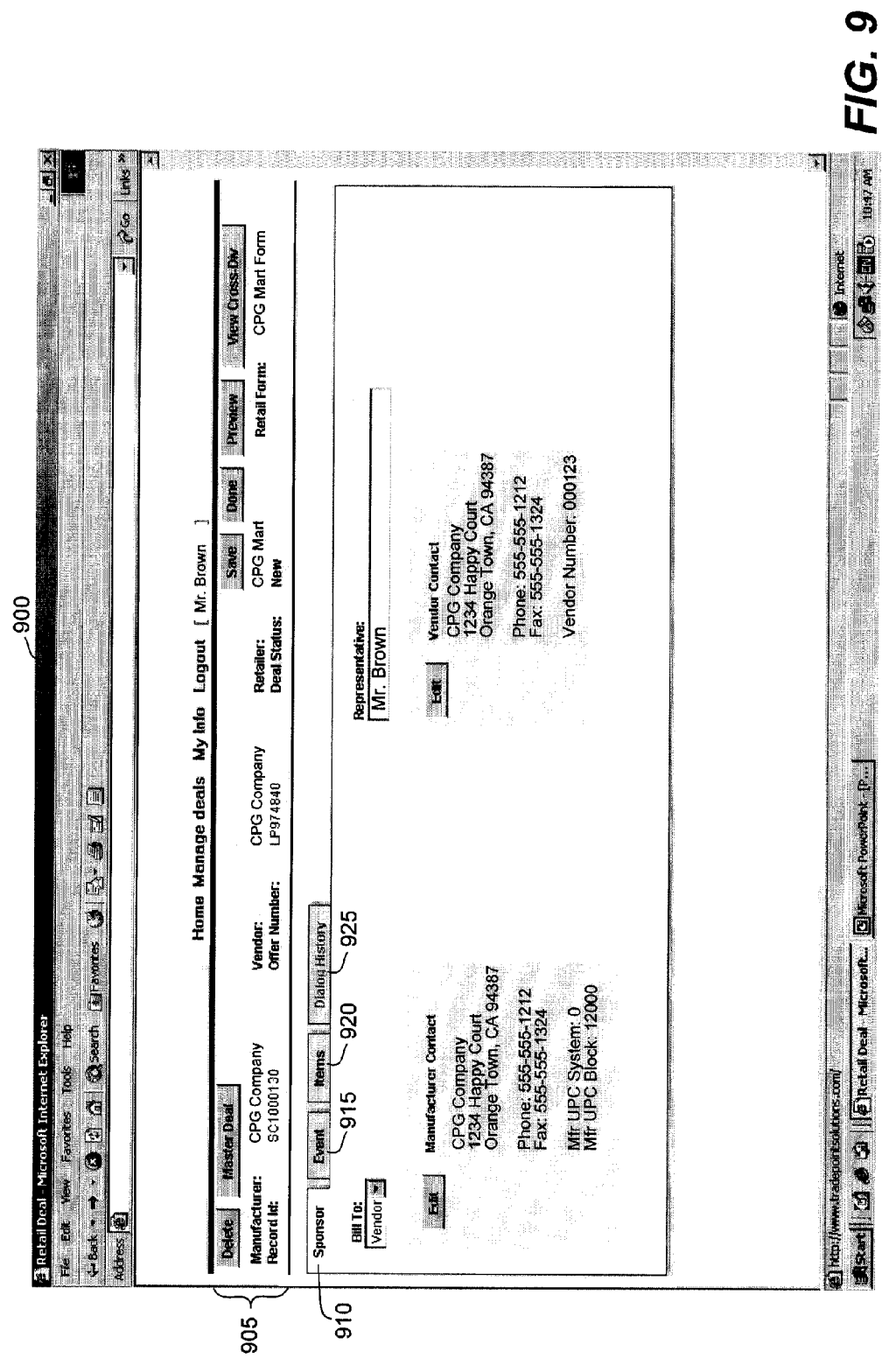

FIG. 9 shows a screen display of a user interface 900 generated on the vendor computer 110. This user interface 900 enables a user, such as a vendor representative, to interact with the promotion event platform 140 to manage promotion events. In user interface 900, when the vendor 105 logs in through vendor interface module 220, the user interface 900 presents the vendor with a promotion event reference 905 with information identifying the manufacturer, promotion event Record ID, Vendor, Offer Number, Retailer, Deal Status, and a reference to a Retail Form. A Sponsor tab 910 identifies the sponsor of the master deal. Other tabs for selection by the vendor include an Event tab 915, an Items tab 920 and a Dialog History 925. By clicking any of tabs 910-925, the user accesses additional information about any of their promotion events.

Figure 10:
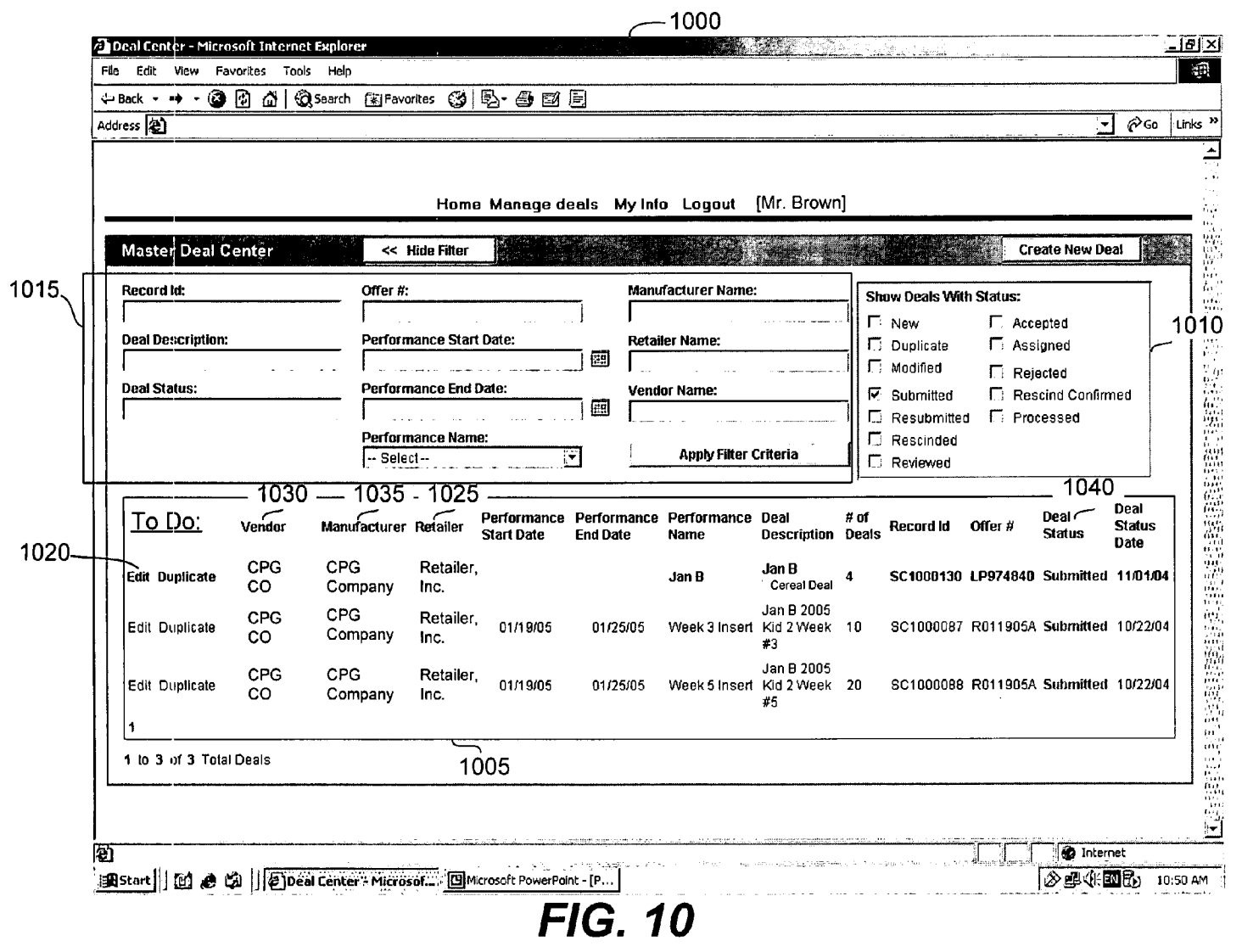

FIG. 10 shows a user interface 1000 providing a master deal center for managing promotion events or deals, in accordance with one embodiment of the present invention. The master deal center is presented to the user after logging into the promotion event platform 140. The master deal center presented to a vendor 105 upon logging in is structurally similar to the master deal center presented to a retailer 120, although some of the displayed data may be different, such as status indicators. FIG. 10 shows a master deal center presented to the vendor 105. In this embodiment, a "To Do" list or table 1005 provides the user with a work list showing each of the promotion events that are managed by promotion event platform 140 on behalf of that vendor. The "To Do" list 1005 shows deals and promotion events managed by platform 140 with terms provided in the columns of table 1005 as shown. In this example, the "To Do" list shows the name(s) of retailer(s) 1025 to whom the event is directed, as well as the name of the vendor 1030 and manufacturer 1035 associated with each deal. Further columns in "To Do" list 1005 provide additional terms for each promotion event including performance start and end dates, performance names, deal description, number of deals, record ID, offer number, Deal Status 1040 and Deal Status date. Other terms and event description information can be provided in further columns of table 1005 as desired. In addition, the "To Do" list 1005 includes an Edit link 1020 next to each event enabling the user to quickly access each event for further modification and processing.

In FIG. 10, each promotion event (or "deal") is assigned a "Deal Status" 1040, also referred to herein as a status indicator. Users may query and sort the records in the deal transaction database 210 according to Deal Status criteria. The Deal Status is organized as follows:

To Do
New
Duplicate
Modify
Pending
Submit
Resubmit
Reviewed
Complete
Postpone
Rescind
Accept
Reject In the preceding list, the designations "To Do," "Pending," and "Complete" describe workflow status. Each workflow status is sub-divided into negotiation statuses, such as the "New," "Duplicate," and "Modify" status under the "To Do" workflow status. "To Do" describes those events requiring further workflow processing by the user viewing the events in an appropriate user interface. "Pending" refers to the notification and/or re-notification of a retailer or vendor that a promotion event is awaiting a response from another party, and the platform 140 is waiting for their review and consideration. "Complete" indicates that the negotiation of a promotion event has been completed. The workflow status and negotiation status is recorded in the status indicator associated with each promotion event or deal.

The master deal center 1000 provides a powerful tool for classifying, categorizing and managing the various promotion events on behalf of a vendor. In this embodiment, deals can be sorted and organized according to the status, using status box 1010. In this embodiment, deals have status indicators reflecting any number of possible statuses for the deal. For example, a Deal Status can be "new", "duplicate", "modified", "submitted", "resubmitted", "rescinded", "reviewed", "accepted", "assigned", "rejected", "rescind" "confirmed", and "processed". The deals can easily be viewed and categorized according to these status indicators, using status box 1010. The master deal center 1000 also enables classification, categorization, and filtering of deals according to any of the other fields or terms attached to those deals, using text entry fields and pull-down selections in filter box 1015. Terms which can be used to filter deals, using box 1015, include record ID, deal description, deal status, offer, performance start date, performance end date, manufacturer name, retailer name, vendor name and performance name as shown in box 1015.

In one example of using promotion event platform 140, a vendor has begun to define a new promotion event, but has not completed it. The vendor saves the deal for later editing. Later, when the vendor logs onto the platform, the vendor sees in his "To Do" list the saved promotion event with a status of "New." Then vendor accesses the promotion event, completes it, and clicks a "Submit" button. When the vendor clicks the "Submit" button, the status indicator of the promotion event is reassigned. In a user interface accessible by the vendor, the vendor sees the submitted promotion event with a status indicator designating the "Pending" workflow status, and a negotiation status of "Submitted." When the submitted promotion event is viewed through a user interface accessed by the retailer, the name of the submitted promotion event is listed in a "To Do" box or list, and the negotiation status of "Submitted" for the submitted promotion event is displayed. When the retailer selects the "Accept" button, the workflow status of the promotion is designated as "Complete." Alternatively, when the retailer selects the "Modify" button, the workflow status is assigned "To Do," and appears in the To Do list viewed by the vendor when the vendor next accesses the platform 140.

Figure 11:
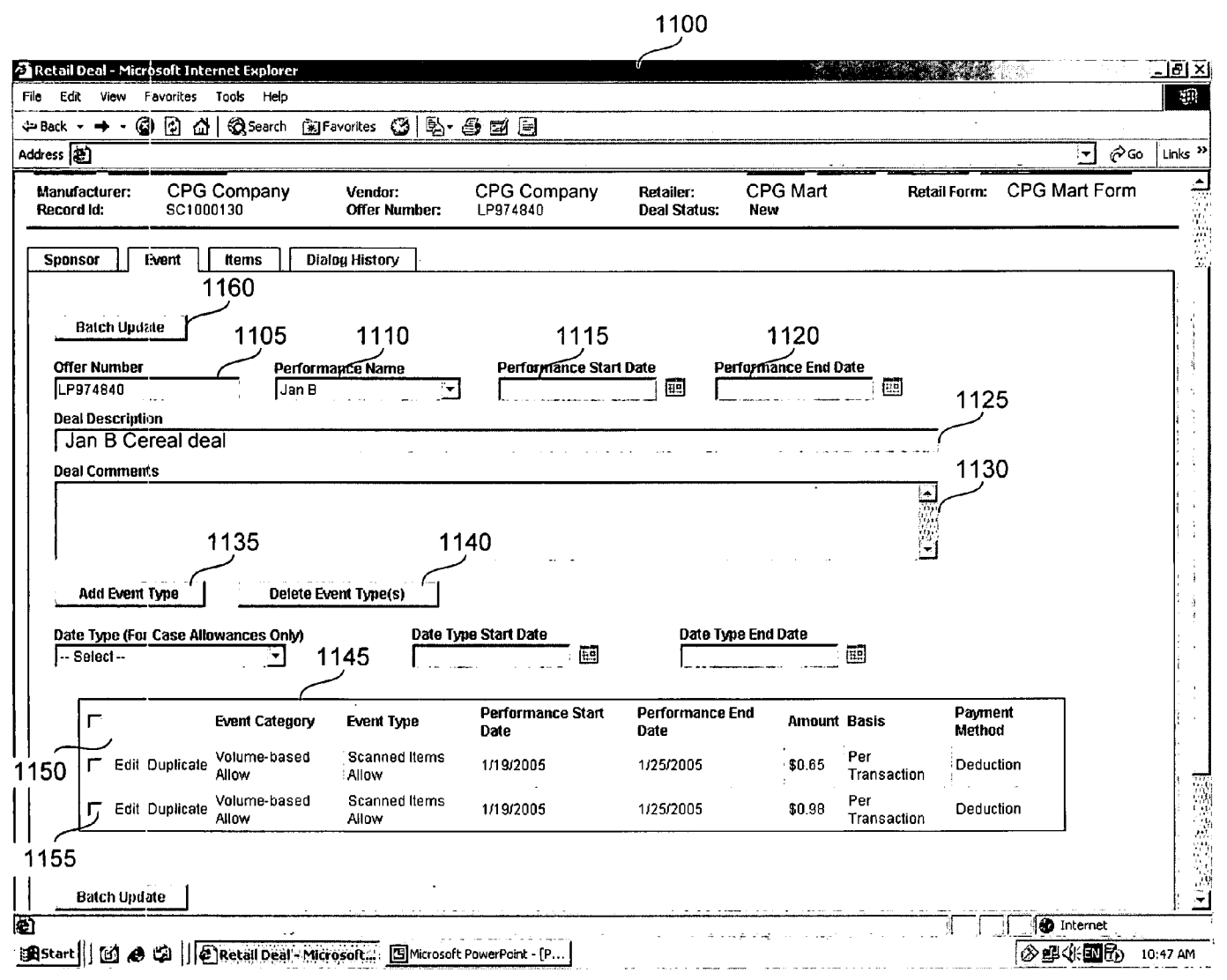

In FIG. 9, when the event tab 915 is selected, the user is presented with the user interface 1100 shown in FIG. 11. In the interface 1100, information defining the event is presented to the vendor in fields as shown. The vendor can then use pull down menus and text entry boxes as needed to enter and edit terms when defining the promotion event. In this example, fields include an offer number 1105, identifying the promotion event being defined by a number. Further fields include performance name 1110 with a code designating the performance desired for the promotional event, a performance start date 1115, and a performance end date 1120. A deal description text entry box 1125 allows the vendor to enter text describing the promotional event being defined. Comments can be entered in deal comments field entry box 1130. Event types, also referred to herein as event descriptions, can be added and deleted using add event type button 1135 and delete event type button 1140, as desired. A table 1145 shows a breakdown of promotional events being defined.

In FIG. 11, two promotional events are shown, with a breakdown of the elements or terms defining that promotional event. As shown, the terms include event category, event type, performance start date, performance end date, amount, basis and payment method as column headers with the rows in the columns defining the promotional event according to those columns. The first event 1150 is in the volume-based allowance event category. The event type for event 1150 scanned items allowance. Performance start and end dates are shown, as well as an amount for the promotional event and a basis and payment method. The same terms are shown for the second promotional event 1155.

Figure 12:
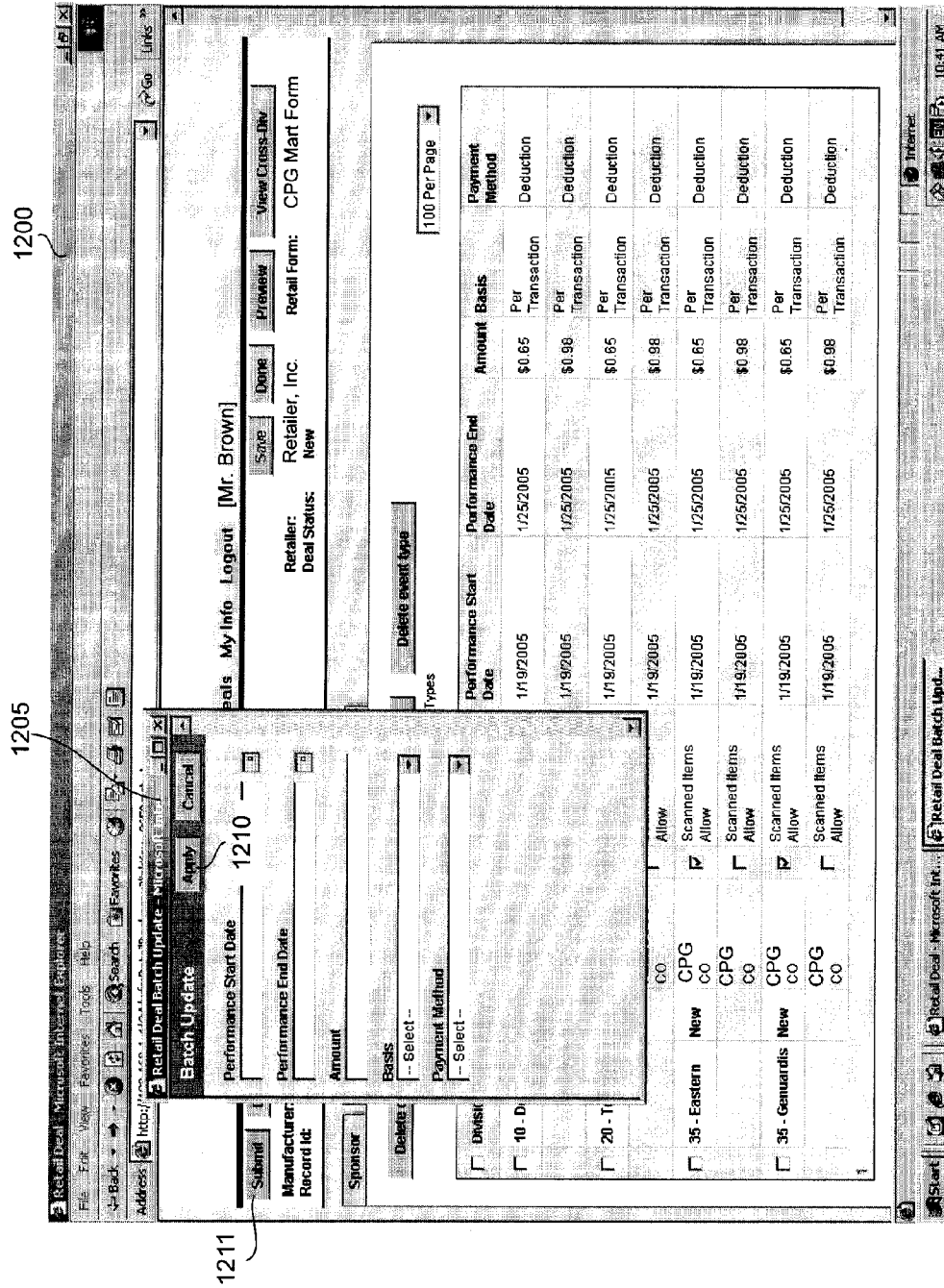

FIG. 12 shows a user interface 1200 with a batch update window 1205 presented to the vendor when a batch update box 1160 is selected in FIG. 11. When the batch update box 1160 is clicked, a batch edit module 255 in promotion event platform 140 is activated and interacts with the batch update window 1205 of FIG. 12. Using the batch edit or update function, the user can enter revisions to one or more common fields of a plurality of promotion event records stored in the promotion event platform 140. For instance, these promotion event records can be common deals of a master deal. In window 1205, the user can enter a performance start date, a performance end date, an amount, a basis, or payment method as examples of terms to be revised. Other terms, as described above with regard to defining a promotion event can also be presented in other suitable batch update windows, as will be understood by those skilled in the art. When a user enters a revision to one or more of the terms in the window 1205, and clicks the apply button 1210, the revision is applied across all of the promotion event records, revising the same field or fields. The particular promotion event records to be updated can be identified by the user through the user interface. The fields revised correspond to the text entry boxes in the batch update window 1205 in which revisions are entered by the user. Hence, using the batch update window 1205 and batch edit module 255 of promotion event platform 140, a single revision can be replicated across any number of promotion event records managed by promotion event platform 140 using a single click of the apply button 1210.

FIG. 13 shows a list of items by name and other categorical information provided in a table 1305 of a user interface 1300 accessible by the vendor through vendor interface module 220. The items displayed in table 1305 include various attributes including item number 1310, UPC case code 1315, UPC consumer code 1320, item description 1325 and other information as shown. A match description 1330 indicates the status of the matching function performed by matching module 230, as described above. A match indicator such as "verified" or "no match" indicates to the vendor whether the match was successful ("verified") or not ("no match") in matching the designated items to the item list provided by retailer 120. In this example, the vendor is provided the opportunity in columns 1335 and 1340 to select items for applying deductions 1 or 2 as shown in user interface 1300. Such deductions are examples of one type of promotion scheme in defining the promotion event.

Figure 14:
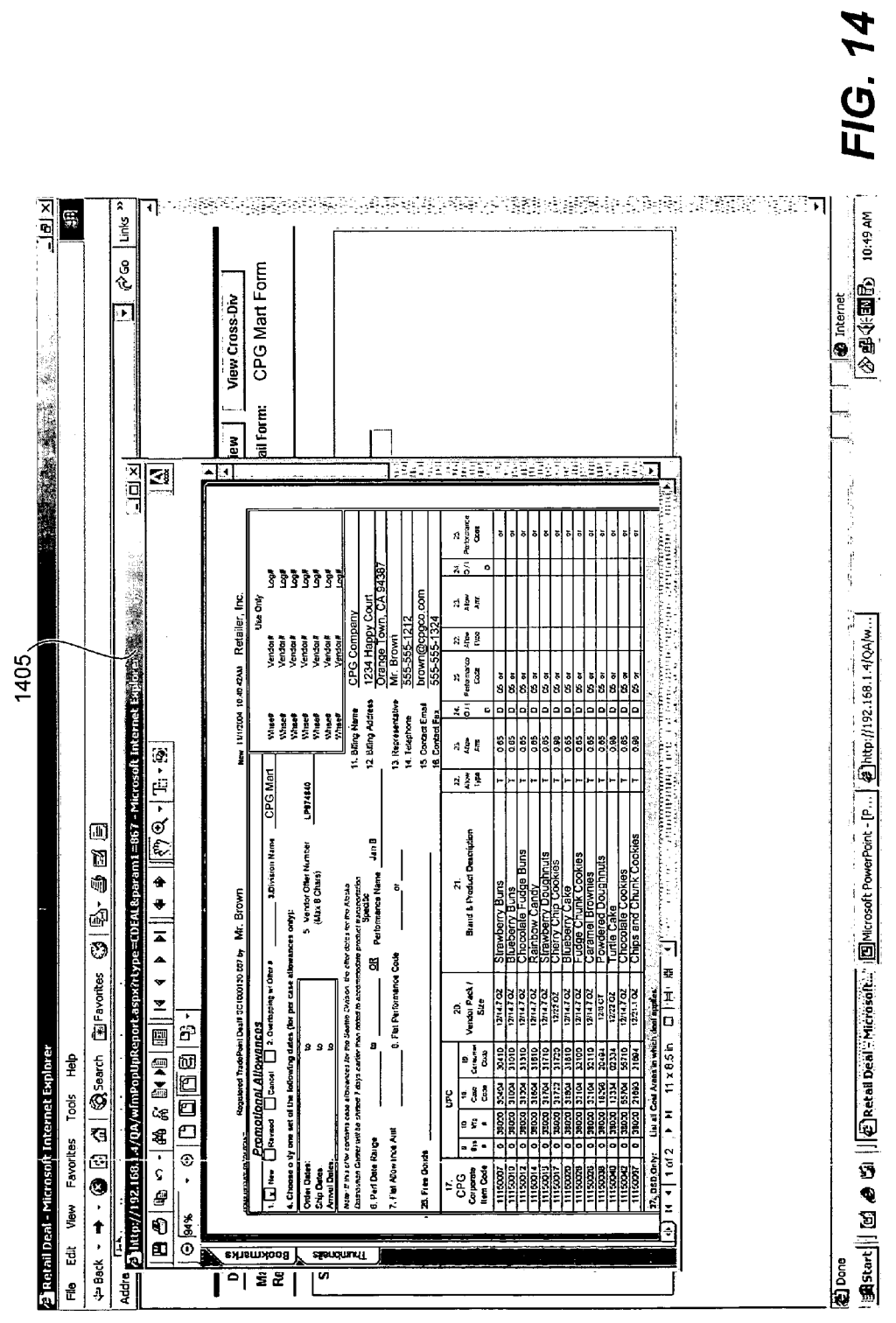

FIG. 14 shows an output of the deal in a desired format for the retailer in window 1405. In this example, the format of the deal is a .pdf form of a promotion form accepted by certain retailers. The window 1405 shows a screen display of the form, which corresponds to the appearance of the form when it is printed. As can be shown in window 1405, the information in the promotion form provides an organized presentation of the item descriptions and other terms of the promotional event as described above.

Figure 15:
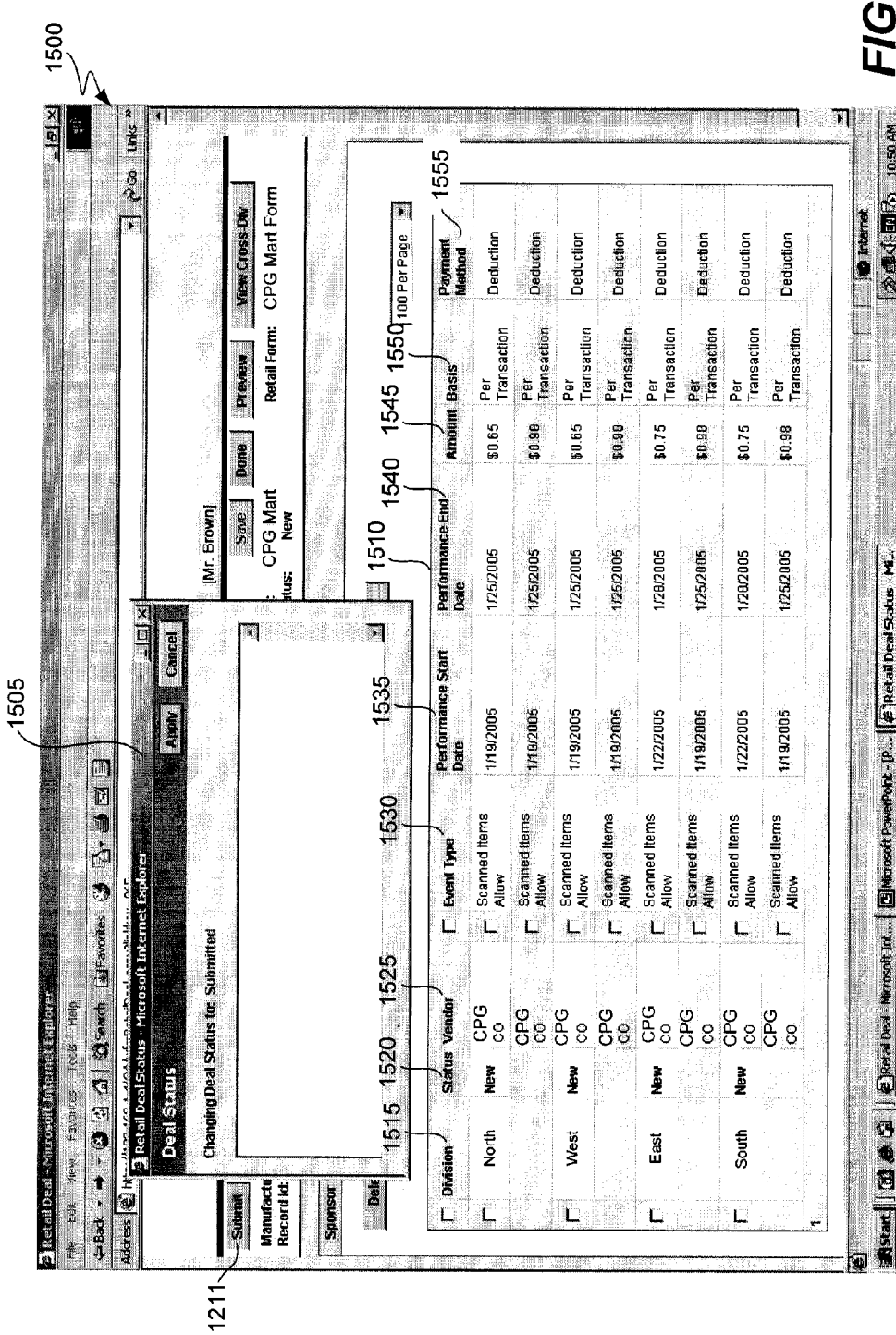

FIG. 15 shows a user interface 1500 in which a list of promotion events stored in the deal transaction database 210 are displayed for viewing using the vendor computer 110. Also, a similar user interface is accessible by retailer computer 130 to define a retailer's view of the promotion events. In this example, as shown in window 1505, the deal has been stored, as described above as respect to FIG. 3, and has a status indicator designating that the deal has submitted status. In table 1510, a list of promotion events by division is provided. This is reflected in division column 1515. A status indicator 1520 is provided for each deal, in this example, indicating that the deal has "New" status. A vendor name 1525 is provided for each deal, as well as an event type 1530, performance start date 1535, performance end date 1540, amount 1545, basis 1550 and payment method 1555, all of which define terms of the promotion event as described above. Using user interface 1500 of FIG. 15, a user can select various divisions of a retailer and further define the promotion event with respect to that division. In this way, the promotion event platform 140 provides refinement of promotional events within one or more retailers, as desired for the particular promotion.

As shown in FIGS. 12 and 15, by clicking a Submit button 1211, the promotion event platform 140 will affix a sending user's digital signature to an output format of the promotion event (e.g., .pdf). The promotion event platform 140 also presents additional buttons and/or check boxes as required allowing the vendor user to actively represent that the terms of any deal comply with the "equal and proportionate terms" requirements of the Robinson-Patman Act. Additionally, as required the vendor user may also be presented with additional check boxes or buttons enabling them to affirmatively agree to 10 any other representations, warranties, or covenants required by any retailer.

Figure 16:
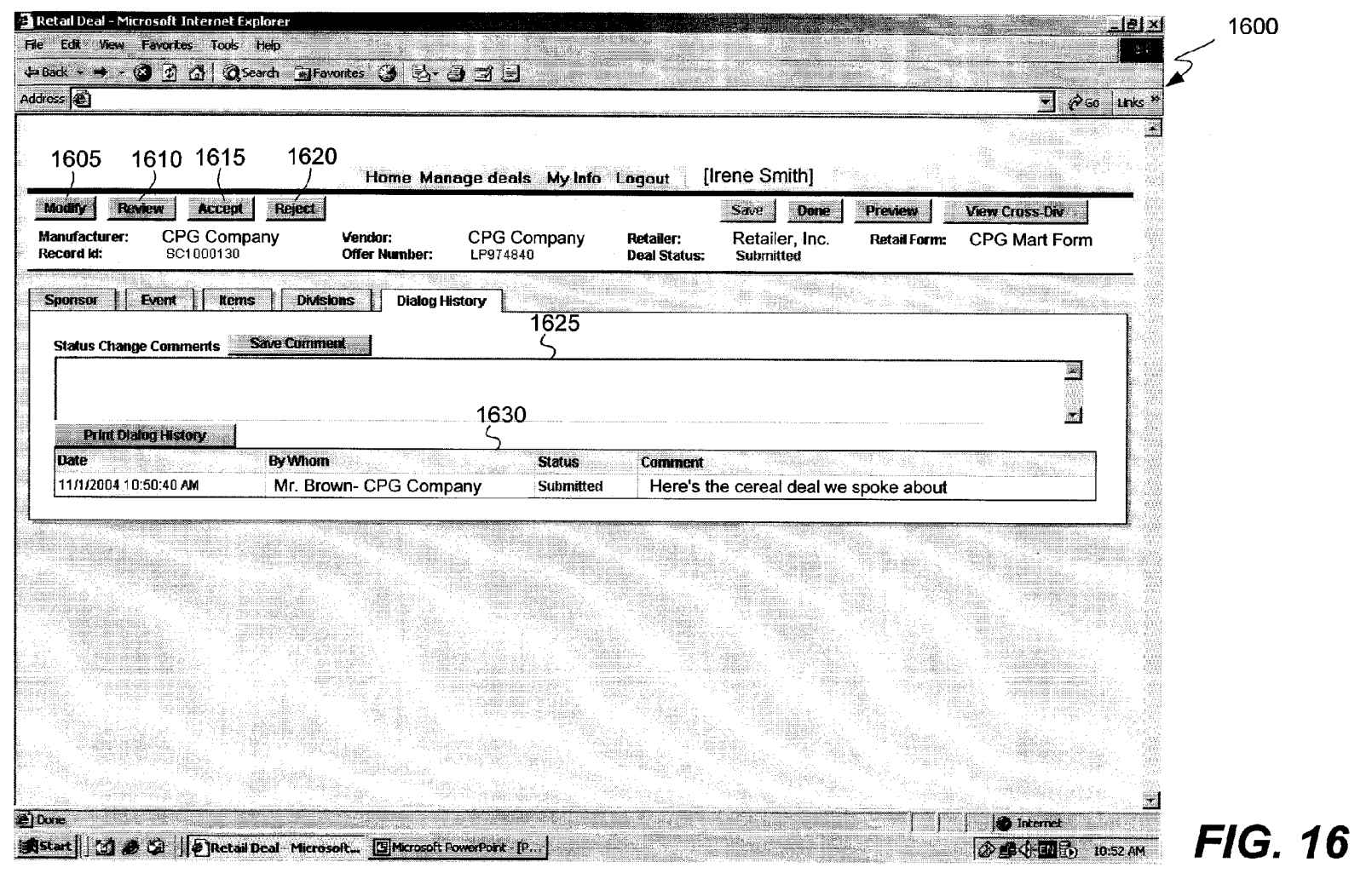

FIG. 16 shows a user interface 1600 accessible by retailer computer 130 during a negotiation phase of a deal, that is, after the deal has been submitted. In this user interface 1600, the retailer can select a Modify button 1605, indicating to deal transaction module 240 that the retailer wishes to modify the deal. A Review button 1610 updates a status of the deal to show that the deal has been reviewed or is under review, and an Accept button 1615 can be selected by the retailer, as described above in step 340c of FIG. 3 to accept the deal. A Reject button 1620 can be selected to indicate to the deal transaction module 240 that the deal is rejected. In this example, in a Status Change Comments box 1625, the retailer can enter comments or requested changes to the deal that are received by the promotion event platform 140 and later presented to the vendor computer 110 through an appropriate user interface. A dialog history 1630 is also provided showing a history of the negotiation comments exchanged between the vendor and retailer.

Figure 17:
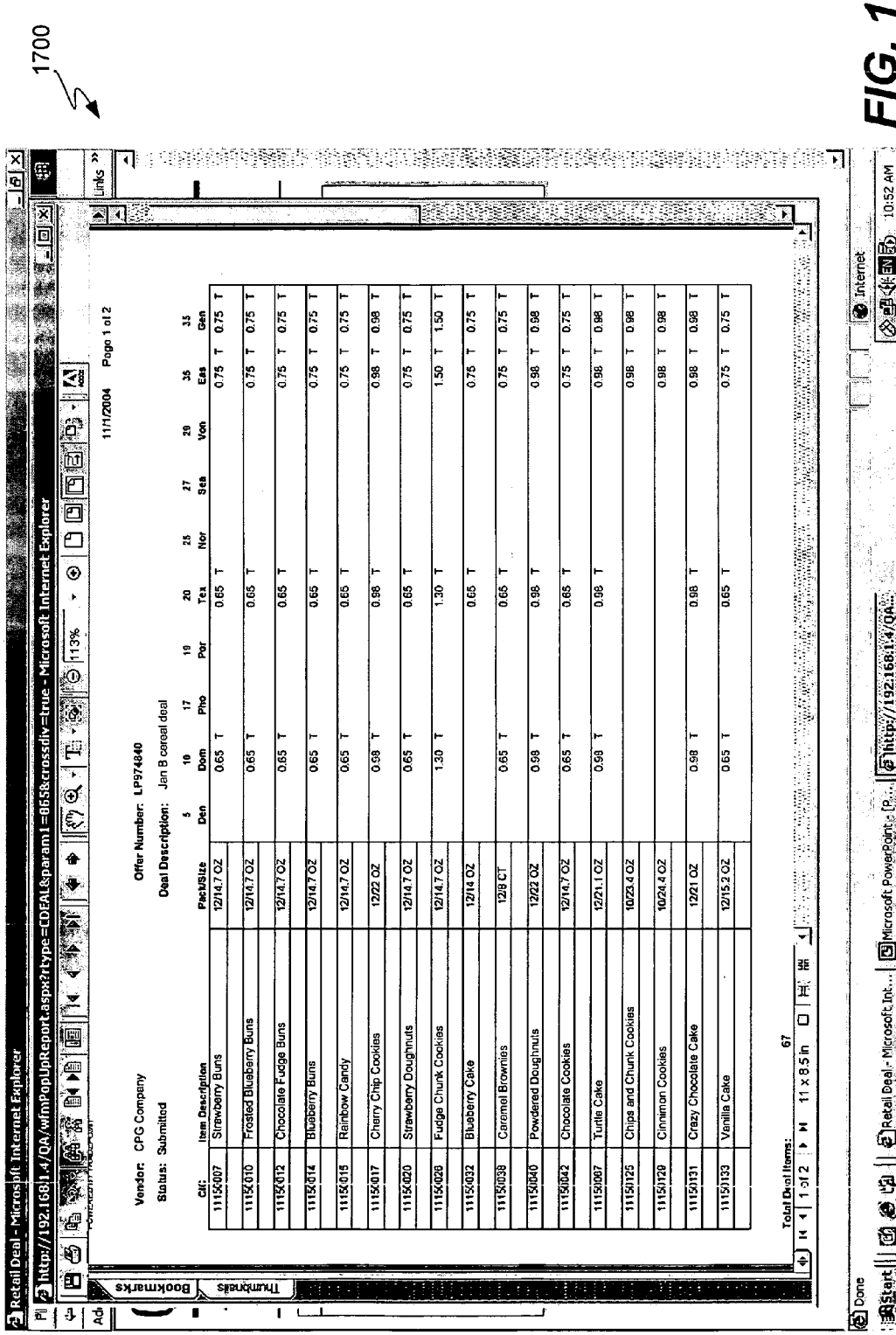

FIG. 17 shows a user interface 1700 of one example of an output of the deal in a desired format for the retailer, such as a PDF file.

Figure 18:
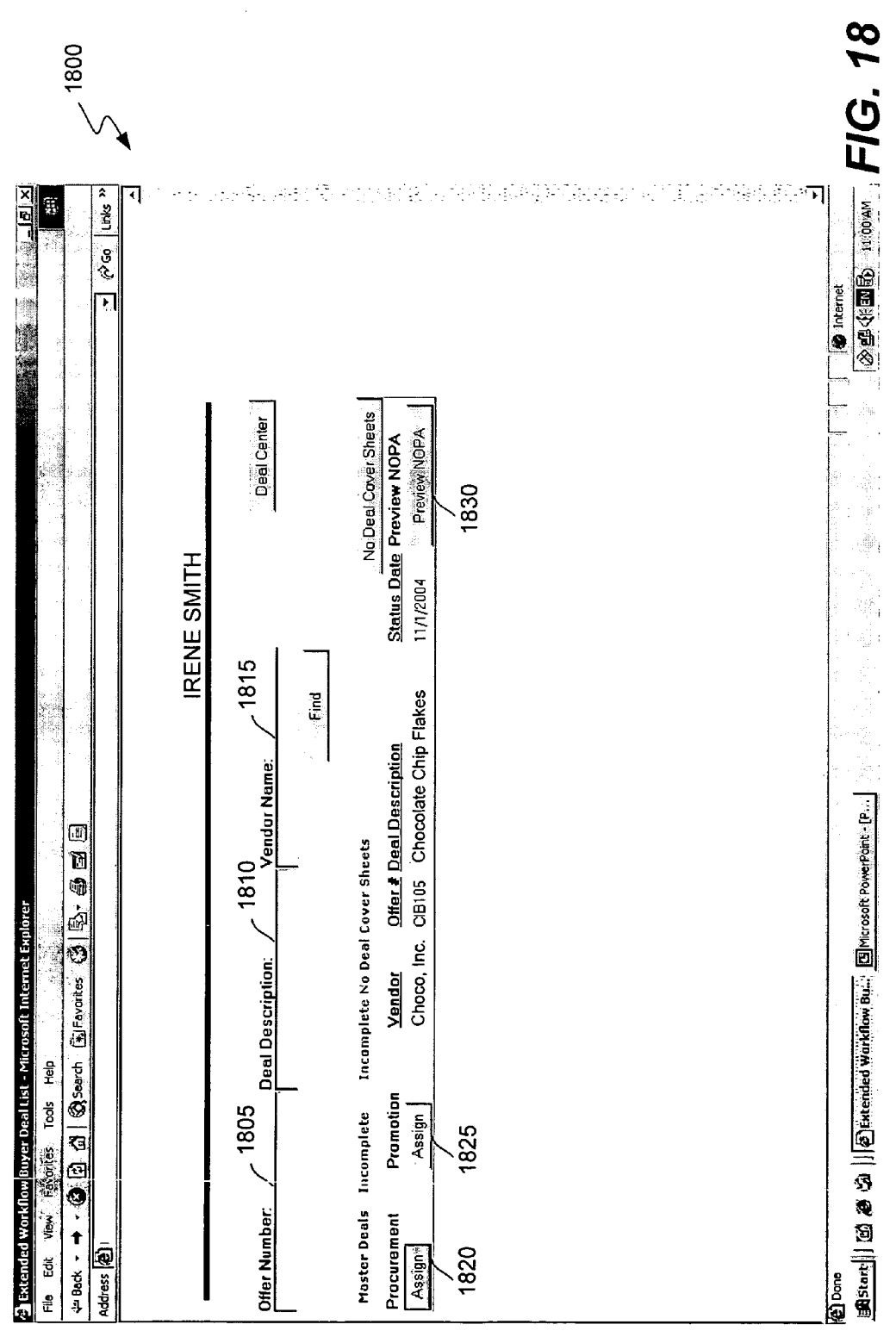

FIG. 18 shows a user interface 1800 with a promotion event management tool for a buyer, generated and accessible according to one embodiment of the present invention, corresponding to the workflow described above with respect to FIG. 4A. As shown, the buyer can locate and sort accepted deals by offer number 1805, deal description 1810 or vendor name 1815. The buyer is provided the opportunity to assign deals to a procurement specialist, using an assign button 1820. Or, the deal can be assigned to a promotion specialist using assign button 1825, corresponding to steps 430 and 450 in FIG. 4A above. The formatted deal can be previewed using a preview promotion form button 1830.

Figure 19:
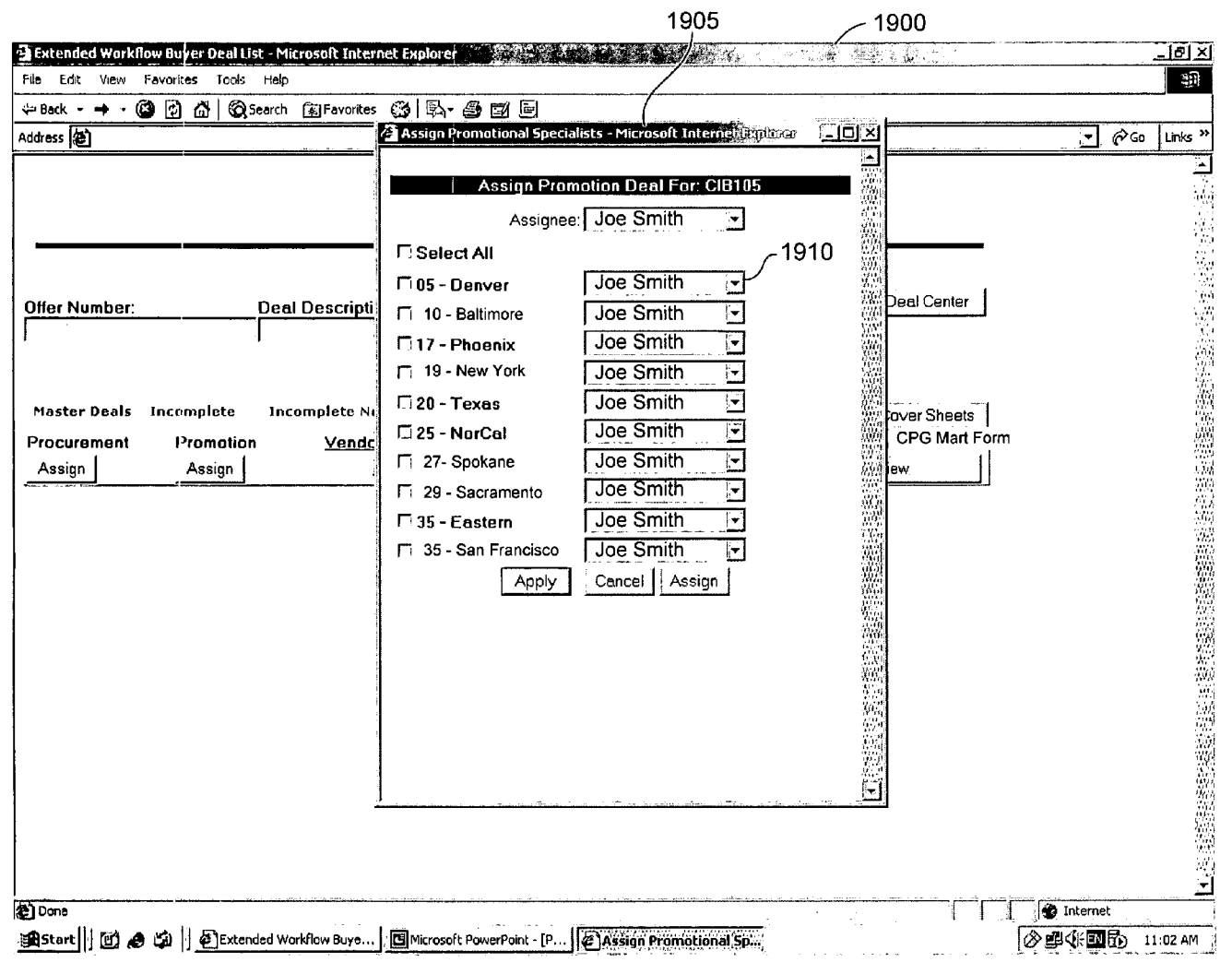
Figure 20:
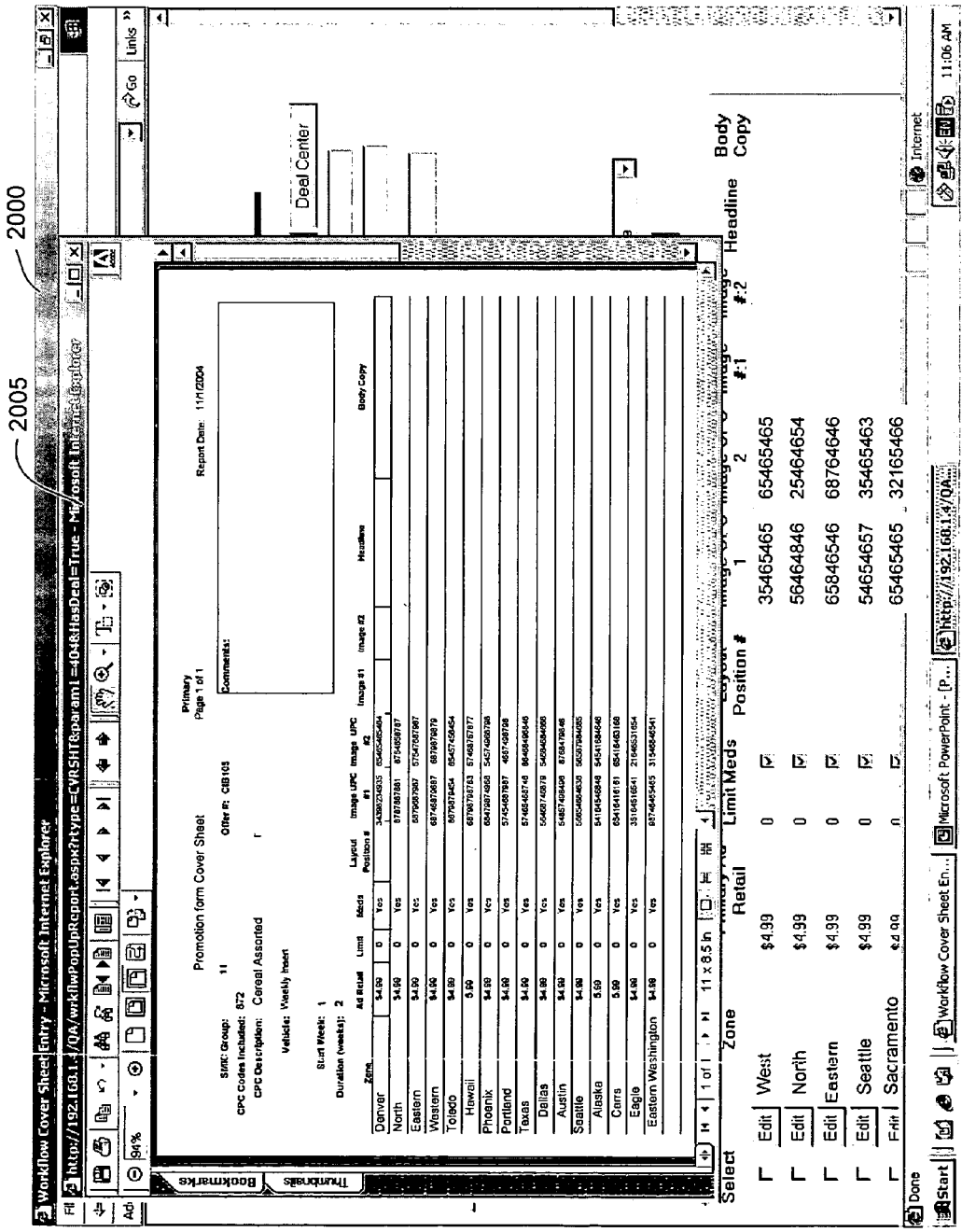

FIG. 19 shows an assign promotion deal window 1905 of a user interface 1900 which is presented when the buyer selects the assign button 1820 or 1825. In this example, a procurement specialist, Joe Smith, is selected as the specialist to whom deals in all of the divisions shown in window 1905, Denver, Dominics, Phoenix, etc. is assigned. Other procurement specialists can be selected for each division using pull down menus such as menu 1910. Using assign promotion deal window 1905, deals can be assigned as desired on a per division and per procurement specialist basis. FIG. 20 shows a user interface 2000 with a window 2005 in which a cover sheet is built for completion by the buyer as described above in steps 420 and 425 of FIG. 4A.

FIG. 21 shows a user interface 2100 presented to a buyer, in which the buyer can manage deals which have been assigned, as described above with respect to FIG. 4A. The buyer user interface 2100 provides similar functionality as that described above for vendors and retailers.

Embodiments of the invention, including the platforms, methods, apparatus, functions and modules described herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A computer-implemented method for managing a promotion event over a data network between a retailer and a vendor each having an associated computer in communication with the data network, the promotion event providing a scheme for rewarding the retailer for offering designated items supplied through the vendor for sale to consumers on behalf of the vendor, the method comprising the steps of:
defining the promotion event to include terms, the terms including an event description, a category, and a designated items description, the terms situated in fields of a promotion event record;
matching the designated items description to a list of items stored in an item table, the list of items authorized for sale by the retailer;
validating, utilizing a computer, the fields in the promotion event record as conforming to requirements of a deal sheet associated with the retailer, wherein the validating also includes ensuring the vendor completes all required fields of the deal sheet, and performing calculations to automatically complete at least one field of the deal sheet;
sending, when the fields in the promotion event record do not conform to the deal sheet requirements, an edit message to the vendor computer over the data network, the edit message requesting editing of the terms in the promotion event record;
storing, within a deal transaction database, when the fields in the promotion event record conform to the deal sheet requirements, the promotion event record as a deal in a deal transaction storage medium, the deal being designated as having a submitted status;
providing, when the deal has the submitted status, read access to the stored deal for the retailer computer over the data network;
receiving a deal negotiation message from the retailer computer over the data network;
designating, responsive to receiving the deal negotiation message, the stored deal as having a negotiate status;

enabling viewing of the negotiate status of the stored deal, by the vendor computer over the data network; and providing, responsive to receiving the deal negotiation message, access to the vendor computer to edit the stored deal over the data network.

2. The computer-implemented method of claim 1, wherein the step of defining the promotion event includes:

generating a user interface accessible by the vendor computer over the data network.

3. The computer-implemented method of claim 1, further comprising the step of:

receiving a request message from the retailer computer over the data network, wherein the request message includes a request for defining of the promotion event.

4. The computer-implemented method of claim 1, wherein the deal negotiation message includes a modify selection.

5. The computer-implemented method of claim 4, further comprising the step of:

designating the stored deal as having a modified status.

6. The computer-implemented method of claim 1, wherein the deal negotiation message includes a reject selection.

7. The computer-implemented method of claim 6, further comprising the step of:

designating the stored deal as having a rejected status.

8. The computer-implemented method of claim 1, further comprising the step of:

receiving comments for the stored deal from the retailer computer over the data network.

9. The computer-implemented method of claim 1, further comprising the step of:

receiving requested revisions to the stored deal from the retailer computer over the data network.

10. The computer-implemented method of claim 1, further comprising the steps of:

receiving a deal accept message from the retailer computer over the data network; and designating, responsive to receiving the deal accept message, the deal as having a complete status.

11. The computer-implemented method of claim 1, further comprising the steps of:

receiving revisions to the terms in the stored deal from the vendor computer over the data network;

updating the stored deal to include the term revisions received from the vendor computer; and providing read access to the stored deal with term revisions for the retailer computer over the data network.

12. The computer-implemented method of claim 11, further comprising the step of:

designating the stored deal as having a resubmitted status.

13. The computer-implemented method of claim 11, further comprising the steps of:

receiving a further deal negotiation message from the retailer computer over the data network;

designating, responsive to receiving the further deal negotiation message, the stored deal as having the negotiate status;

enabling viewing of the negotiate status of the stored deal for the vendor computer over the data network; and providing, responsive to receiving the further deal negotiation message, edit access to the stored deal for the vendor computer over the data network.

14. The computer-implemented method of claim 13, further comprising the steps of:

receiving a deal accept message from the retailer computer over the data network; and designating, responsive to receiving the deal accept message, the stored deal as having a complete status.

15. The computer-implemented method of claim 10, further comprising the step of:

outputting the stored deal in a designated format.

16. The computer-implemented method of claim 15, wherein the designated format is a screen display.

17. The computer-implemented method of claim 15, wherein the designated format is a document image file.

18. The computer-implemented method of claim 1, wherein the event description in the terms of the promotion event includes a classification.

19. The computer-implemented method of claim 1, wherein the terms of the promotion event include one selected from the group consisting of a name of the event, a time period, a performance period, an amount, a basis for the amount, a method of payment, a sponsor, a selection of one or more retailers, and a selection of one or more divisions of the one or more retailers.

20. A computer-implemented method for managing a promotion event over a data network between a plurality of retailers and a vendor each having an associated computer in communication with the data network, the promotion event providing a scheme for rewarding the retailers for offering designated items supplied through the vendor for sale to consumers on behalf of the vendor, the method comprising the steps of:

defining the promotion event to include terms, the terms including an event description, a category, and a designated items description, the terms stored in fields of a promotion event record;

receiving a selection of divisions within one or more of the retailers;

matching the designated items description to lists of items stored in an item table, the lists of items authorized for sale by the selected retailer divisions;

validating, utilizing a computer, the fields in the promotion event record as conforming to requirements of a master deal sheet associated with the retailers, wherein the validating also includes ensuring the vendor completes all required fields of the master deal sheet, and performing calculations to automatically complete at least one field of the master deal sheet;

sending, when the fields in the promotion event record do not conform to the master deal sheet requirements, an edit message to the vendor computer over the data network, the edit message requesting editing of the terms in the promotion event record;

storing, within a deal transaction database, when the fields in the promotion event record conform to the master deal sheet requirements, the promotion event record as a deal in a deal transaction storage medium, the deal having a submitted status;

providing, when the deal has the submitted status, access to the stored deal for the retailer computers over the data network;

receiving a deal negotiation message from the retailer computer over the data network;

designating, responsive to receiving the deal negotiation message, the stored deal as having a negotiate status;

enabling viewing of the negotiate status of the stored deal, by the vendor computer over the data network; and providing, responsive to receiving the deal negotiation message, access to the vendor computer to edit the stored deal over the data network.

21. A computer-implemented method for managing a plurality of promotion events over a data network between a retailer and a vendor each having an associated computer in communication with the data network, each promotion event providing a scheme for rewarding the retailer for offering designated items supplied through the vendor for sale to consumers on behalf of the vendor, the method comprising the steps of:

defining each promotion event to include identification information and terms, wherein the terms including a category;

defining, utilizing a computer, a plurality of promotion event records corresponding to the promotion events, each promotion event record including a structure of fields, the terms of each promotion event stored in the fields of the corresponding promotion event record;

storing, within a deal transaction database, the plurality of promotion event records as a deal in a deal transaction storage medium, each promotion event record having a name and a status indicator designating a status of negotiation of the corresponding promotion event;

generating a list of the names and status indicators of the promotion events; and providing access to the list.

22. The computer-implemented method of claim 21, wherein the step of providing access to the list includes:

generating a user interface showing the list, the user interface accessible by the retailer computer.

23. The computer-implemented method of claim 21, wherein the step of providing access to the list includes:

generating a user interface showing the list, the user interface accessible by the vendor computer.

24. The computer-implemented method of claim 21, wherein the list further includes information identifying retailers associated with the respective promotion event records.

25. The computer-implemented method of claim 21, wherein one of the status indicators is selected from the group consisting of "to do," "pending," "complete," "new," "duplicate," "modified," "submitted," "resubmitted," "rescinded," "reviewed," "accepted," "assigned," "rejected," "rescind," "confirmed," and "processed."

26. A computer-implemented method for managing a plurality of promotion events over a data network between a retailer and a vendor each having an associated computer in communication with the data network, each promotion event providing a scheme for rewarding the retailer for offering designated items supplied through the vendor for sale to consumers on behalf of the vendor, the method comprising the steps of:

defining each promotion event to include terms, wherein the terms include a category;

defining, utilizing a computer, a plurality of promotion event records corresponding to the promotion events, each promotion event record including a structure of fields, the terms of each promotion event stored in the fields of the corresponding promotion event record;

storing, within a deal transaction database, the plurality of promotion event records as a deal in a deal transaction storage medium, the deal being designated as having a submitted status;

receiving a batch edit message including a revision to one or more fields in the promotion structure; and revising the plurality of promotion event records according to the revision in the batch edit message, including replicating the revision across the plurality of promotion event records revising the same field or fields in each of the promotion event records.

27. The computer-implemented method of claim 10, further comprising the steps of:

determining a deal type for the deal as performance based or non-performance based;

if the deal type is non-performance based, then:
assigning the deal to a procurement specialist;
providing read access for the promotion event record to the procurement specialist;

else, if the deal type is performance based, then:
defining a cover sheet for the deal;
assigning the deal to a promotion specialist, wherein the promotion specialist is associated with a division of the retailer; and providing read access for the deal to the promotion specialist.

28. The computer-implemented method of claim 27, wherein the step of determining the deal type includes identifying the deal type based on the event description.

29. The computer-implemented method of claim 27, wherein the step of assigning the deal to the procurement specialist or the promotion specialist includes designating the deal as having an assigned status.

30. The computer-implemented method of claim 27, wherein the promotion event record is associated with a single division of the retailer.

31. The computer-implemented method of claim 27, further comprising the step of:

receiving log numbers for the deal.

32. The computer-implemented method of claim 27, further comprising the steps of:

receiving a processed message; and designating the deal as having a processed status.

33. A computer program product, stored on a processor readable medium, comprising instructions operable to cause a computer to perform a method for managing a promotion event over a data network between a retailer and a vendor each having an associated computer in communication with the data network, the promotion event providing a scheme for rewarding the retailer for offering designated items supplied through the vendor for sale to consumers on behalf of the vendor, the method comprising the steps of:

defining the promotion event to include terms, the terms including an event description and a designated items description, the terms situated in fields of a promotion event record;

matching the designated items description to a list of items stored in an item table, the list of items authorized for sale by the retailer;

validating, utilizing the computer, the fields in the promotion event record as conforming to requirements of a deal sheet associated with the retailer, wherein the validating also includes ensuring the vendor completes all required fields of the deal sheet, and performing calculations to automatically complete at least one field of the deal sheet;

sending, when the fields in the promotion event record do not conform to the deal sheet requirements, an edit message to the vendor computer over the data network, the edit message requesting editing of the terms in the promotion event record;

storing, within a deal transaction database, when the fields in the promotion event record conform to the deal sheet requirements, the promotion event record as a deal in a deal transaction storage medium, the deal being designated as having a submitted status;

providing, when the deal has the submitted status, read access to the stored deal for the retailer computer over the data network;

receiving a deal negotiation message from the retailer computer over the data network;

designating, responsive to receiving the deal negotiation message, the stored deal as having a negotiate status;

enabling viewing of the negotiate status of the stored deal by the vendor computer over the data network; and providing, responsive to receiving the deal negotiation message, access to the vendor computer to edit the stored deal over the data network.

34. The computer program product of claim 33, the method further comprising the steps of:

receiving a deal accept message from the retailer computer over the data network; and designating, responsive to receiving the deal accept message, the deal as having a complete status.

35. The computer program product of claim 33, the method further comprising the steps of:

receiving revisions to the terms in the stored deal from the vendor computer over the data network;

updating the stored deal to include the term revisions received from the vendor computer; and providing read access to the stored deal with term revisions for the retailer computer over the data network.

36. The computer program product of claim 35, the method further comprising the steps of:

receiving a further deal negotiation message from the retailer computer over the data network;

designating, responsive to receiving the further deal negotiation message, the stored deal as having the negotiate status;

enabling viewing of the negotiate status of the stored deal for the vendor computer over the data network; and providing, responsive to receiving the further deal negotiation message, edit access to the stored deal for the vendor computer over the data network.

37. The computer program product of claim 36, the method further comprising the steps of:

receiving a deal accept message from the retailer computer over the data network; and designating, responsive to receiving the deal accept message, the stored deal as having a complete status.

38. An apparatus for managing a promotion event over a data network between a retailer and a vendor each having an associated computer in communication with the data network, the promotion event providing a scheme for rewarding the retailer for offering designated items supplied through the vendor for sale to consumers on behalf of the vendor, the apparatus comprising:

at least one processor including:

an event definition module configured to define the promotion event to include terms, the terms including an event description, a category, and a designated items description, the terms situated in fields of a promotion event record;

a matching module configured to match the designated items description to a list of items stored in an item table, the list of items authorized for sale by the retailer;

a validation module configured to validate the fields in the promotion event record as conforming to requirements of a deal sheet associated with the retailer, wherein the validating also includes ensuring the vendor completes all required fields of the deal sheet, and performing calculations to automatically complete at least one field of the deal sheet;

a vendor interface module configured to send, when the fields in the promotion event record do not conform to the deal sheet requirements, an edit message to the vendor computer over the data network, the edit message requesting editing of the terms in the promotion event record;

a deal transaction module configured to store, when the fields in the promotion event record conform to the deal sheet requirements, the promotion event record as a deal in a deal transaction storage medium, the deal being designated as having a submitted status;

a retailer interface module configured to provide, when the deal has the submitted status, read access to the stored deal for the retailer computer over the data network;

the deal transaction module is further configured to designate, responsive to receiving a deal negotiation message, the stored deal as having a negotiate status; and the vendor interface module is further configured to:

i) enable viewing of the negotiate status of the stored deal by the vendor computer over the data network, and ii) provide, responsive to receiving the deal negotiation message, access to the vendor computer to edit the stored deal over the data network.

39. The apparatus of claim 38 wherein:

the deal transaction module is further configured to designate, responsive to receiving a deal accept message, the deal as having a complete status.

40. The apparatus of claim 38 wherein:

the vendor interface module is further configured to receive revisions to the terms in the stored deal from the vendor computer over the data network; and the deal transaction module is further configured to update the stored deal to include the term revisions received from the vendor computer.

41. The apparatus of claim 38, further comprising:

an output module configured to output the stored deal in a designated format.

42. The apparatus of claim 41, wherein the designated format is a screen display.

43. The apparatus of claim 41, wherein the designated format is a document image file.

44. An apparatus for managing a plurality of promotion events over a data network between a retailer and a vendor each having an associated computer in communication with the data network, each promotion event providing a scheme for rewarding the retailer for offering designated items supplied through the vendor for sale to consumers on behalf of the vendor, the apparatus comprising:

at least one processor including:

an event definition module configured to:

i) define each promotion event to include terms, wherein the terms include a category, and ii) define a plurality of promotion event records corresponding to the promotion events, each promotion event record including a structure of fields, the terms of each promotion event stored in the fields of the corresponding promotion event record;

a deal transaction module configured to store the plurality of promotion event records as a deal in a deal transaction storage medium, the deal being designated as having a submitted status;

a batch edit module configured to:

i) receive a batch edit message including a revision to one or more fields in the structure, and ii) revise the plurality of promotion event records according to the revision in the batch edit message, including replicating the revision across the plurality of promotion event records revising the same field or fields in each of the promotion event records.

\* \* \* \* \*